(12) United States Patent
Ogawa

(10) Patent No.: US 11,843,746 B2
(45) Date of Patent: Dec. 12, 2023

(54) INFORMATION PROCESSING APPARATUS FOR USING SETTING HISTORY INFORMATION INCLUDING DESTINATION INFORMATION ACQUIRED FROM THE TERMINAL DEVICE AND INFORMATION PROCESSING METHOD

(71) Applicant: SHARP KABUSHIKI KAISHA, Sakai (JP)

(72) Inventor: Akira Ogawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/705,080

(22) Filed: Mar. 25, 2022

(65) Prior Publication Data
US 2022/0321710 A1 Oct. 6, 2022

(30) Foreign Application Priority Data

Apr. 2, 2021 (JP) .................................. 2021-063766

(51) Int. Cl.
*H04N 1/00* (2006.01)
*H04N 1/44* (2006.01)

(52) U.S. Cl.
CPC ....... *H04N 1/0097* (2013.01); *H04N 1/00204* (2013.01); *H04N 1/00408* (2013.01); *H04N 1/00514* (2013.01); *H04N 1/00517* (2013.01); *H04N 1/4413* (2013.01); *H04N 1/4426* (2013.01); *H04N 1/4433* (2013.01);
(Continued)

(58) Field of Classification Search
CPC ............. H04N 1/0097; H04N 1/00204; H04N 1/00408; H04N 1/00514; H04N 1/00517; H04N 1/4413; H04N 1/4426; H04N 1/4433; H04N 2201/0072; H04N 2201/0094; H04N 1/00236; H04N 1/00129; H04N 1/00148; H04N 1/00795; H04N 1/04; H04N 1/0461; G06F 2219/6024; G06F 3/1273; G06Q 30/0224; G06Q 30/0255;
(Continued)

(56) References Cited

U.S. PATENT DOCUMENTS 9,846,561 B2    12/2017  Sugita
10,579,313 B1 *  3/2020  Packirisamy ...... H04N 1/00875
(Continued)

FOREIGN PATENT DOCUMENTS

JP    2016-167764 A    9/2016

*Primary Examiner* — Juan M Guillermety
(74) *Attorney, Agent, or Firm* — ScienBiziP, P.C.

(57) ABSTRACT

An information processing apparatus includes a storage, a controller, and a display. The storage stores setting history information in which identification information of a terminal device is associated with history information pertaining to execution of a job using a destination to be managed by the terminal device. The controller restricts displaying the setting history information on the display, when the information processing apparatus is not in a connected state to the terminal device, and displays the setting history information on the display, when the information processing apparatus is in a connected state to the terminal device, and when the identification information acquired from the terminal device in a connected state matches the identification information associated with the history information.

9 Claims, 24 Drawing Sheets

(52) U.S. Cl.
CPC ................ *H04N 2201/0072* (2013.01); *H04N 2201/0094* (2013.01)

(58) Field of Classification Search
CPC ........... G05B 2219/50102; G05B 2219/24055; H04W 28/095; H04W 52/0258
See application file for complete search history.

(56) References Cited

U.S. PATENT DOCUMENTS

2016/0269573 A1    9/2016  Sugita
2020/0177745 A1*   6/2020  Ishida ................ H04N 1/00403

* cited by examiner

FIG. 6

SETTING HISTORY INFORMATION

| JOB ID | EXECUTION DATE AND TIME | JOB TYPE | SETTING VALUE | IDENTIFICATION INFORMATION |
|---|---|---|---|---|
| 1 | 2020/04/01 9:00 | COPY | COLOR MODE: FULL COLOR, DOCUMENT: A4, PAPER: A4, MAGNIFICATION: 100,····· | |
| 2 | 2020/04/01 11:00 | E-mail TRANSMISSION | TRANSMISSION DESTINATION: aaaaa@sample.com, COLOR MODE: FULL COLOR, RESOLUTION: 200x200dpi, FORMAT: PDF,····· | 11:11:11:11:11:11 |
| 3 | 2020/04/01 13:10 | FAX TRANSMISSION | TRANSMISSION DESTINATION: 12345, IMAGE QUALITY: NORMAL CHARACTERS, DENSITY: DARK,····· | 11:11:11:11:11:11 |
| 4 | 2020/04/02 13:30 | E-mail TRANSMISSION | TRANSMISSION DESTINATION: bbbbb@sample.com, COLOR MODE: BLACK AND WHITE, RESOLUTION: 200x200dpi, FORMAT: TIFF,····· | |
| 5 | 2020/04/02 13:40 | E-mail TRANSMISSION | TRANSMISSION DESTINATION: ccccc@sample.com, COLOR MODE: FULL COLOR, RESOLUTION: 400x400dpi, FORMAT: PDF,····· | 22:22:22:22:22:22 |
| 6 | 2020/04/02 13:50 | FAX TRANSMISSION | TRANSMISSION DESTINATION: 67890, IMAGE QUALITY: NORMAL CHARACTERS, DENSITY: AUTOMATIC,····· | 22:22:22:22:22:22 |
| 7 | 2020/04/03 10:00 | E-mail TRANSMISSION | TRANSMISSION DESTINATION: ddddd@sample.com, COLOR MODE: FULL COLOR, RESOLUTION: 400x400dpi, FORMAT: PDF,····· | 11:11:11:11:11:11 |

FIG. 8

| JOB ID (HISTORY ID) | DETERMINATION | AQUISITION DESTINATION TERMINAL DEVICE |
|---|---|---|
| 1 | true | - |
| 2 | true | 11:11:11:11:11:11 |
| 3 | true | 11:11:11:11:11:11 |
| 4 | true | - |
| 5 | false | 22:22:22:22:22:22 |
| 6 | false | 22:22:22:22:22:22 |
| 7 | true | 11:11:11:11:11:11 |

FIG. 10

| JOB ID | JOB TYPE | EXECUTION DATE AND TIME | SETTING VALUE |
|---|---|---|---|
| 1 | COPY | 2020/04/01 9:00 | COLOR MODE: FULL COLOR, DOCUMENT: A4, PAPER: A4, MAGNIFICATION: 100,・・・・・ |
| 2 | E-mail TRANSMISSION | 2020/04/01 11:00 | TRANSMISSION DESTINATION: aaaaa@sample.com, COLOR MODE: FULL COLOR, RESOLUTION: 200x200dpi, FORMAT: PDF,・・・・・ |
| 3 | FAX TRANSMISSION | 2020/04/01 13:10 | 12345, NORMAL CHARACTERS, DARK,・・・・・ |
| 4 | E-mail TRANSMISSION | 2020/04/02 13:30 | TRANSMISSION DESTINATION: bbbbb@sample.com, COLOR MODE: BLACK AND WHITE, RESOLUTION: 200x200dpi, FORMAT: TIFF,・・・・・ |
| 7 | E-mail TRANSMISSION | 2020/04/03 10:00 | TRANSMISSION DESTINATION: ddddd@sample.com, COLOR MODE: FULL COLOR, RESOLUTION: 400x400dpi, FORMAT: PDF,・・・・・ |

FIG. 11

| JOB ID | JOB TYPE | EXECUTION DATE AND TIME | SETTING VALUE |
|---|---|---|---|
| 1 | COPY | 2020/04/01 9:00 | COLOR MODE: FULL COLOR, DOCUMENT: A4, PAPER: A4, MAGNIFICATION: 100, ······ |
| 2 | E-mail TRANSMISSION | 2020/04/01 11:00 | TRANSMISSION DESTINATION: aaaaa@sample.com, COLOR MODE: FULL COLOR, RESOLUTION: 200x200dpi, FORMAT: PDF, ······ |
| 3 | FAX TRANSMISSION | 2020/04/01 13:10 | 12345, NORMAL CHARACTERS, DARK, ······ |
| 4 | E-mail TRANSMISSION | 2020/04/02 13:30 | TRANSMISSION DESTINATION: bbbbb@sample.com, COLOR MODE: BLACK AND WHITE, RESOLUTION: 200x200dpi, FORMAT: TIFF, ······ |
| 5 | E-mail TRANSMISSION | 2020/04/02 13:40 | ***************, COLOR MODE: FULL COLOR, RESOLUTION: 400x400dpi, FORMAT: PDF, ······ |
| 6 | FAX TRANSMISSION | 2020/04/02 13:50 | ****, NORMAL CHARACTERS, AUTOMATIC DENSITY, ······ |
| 7 | E-mail TRANSMISSION | 2020/04/03 10:00 | TRANSMISSION DESTINATION: ddddd@sample.com, COLOR MODE: FULL COLOR, RESOLUTION: 400x400dpi, FORMAT: PDF, ······ |

SETTING HISTORY   JOB STATUS   OK   ALL DELETE

| JOB ID | JOB TYPE | EXECUTION DATE AND TIME | SETTING VALUE |
|---|---|---|---|
| 1 | COPY | 2020/04/01 9:00 | COLOR MODE: FULL COLOR, DOCUMENT: A4, PAPER: A4, MAGNIFICATION: 100,...... |
| 4 | E-mail TRANSMISSION | 2020/04/02 13:30 | TRANSMISSION DESTINATION: bbbbb@sample.com, COLOR MODE: BLACK AND WHITE, RESOLUTION: 200x200dpi, FORMAT: TIFF,...... |
| 5 | E-mail TRANSMISSION | 2020/04/02 13:40 | TRANSMISSION DESTINATION: ccccc@sample.com, COLOR MODE: FULL COLOR, RESOLUTION: 400x400dpi, FORMAT: PDF,...... |
| 6 | FAX TRANSMISSION | 2020/04/02 13:50 | 67890, NORMAL CHARACTERS, AUTOMATIC DENSITY,...... |

SETTING HISTORY

JOB STATUS

OK

ALL DELETE

| SETTING HISTORY INFORMATION | | | | | |
|---|---|---|---|---|---|
| JOB ID | EXECUTION DATE AND TIME | JOB TYPE | SETTING VALUE | TERMINAL IDENTIFICATION INFORMATION | EXECUTION USER |
| 1 | 2020/04/01 9:00 | COPY | COLOR MODE: FULL COLOR, DOCUMENT: A4, PAPER: A4, MAGNIFICATION: 100, ...... | | |
| 2 | 2020/04/01 11:00 | E-mail TRANSMISSION | TRANSMISSION DESTINATION: aaaaa@sample.com, COLOR MODE: FULL COLOR, RESOLUTION: 200x200dpi, FORMAT: PDF, ...... | 11:11:11:11:11:11 | |
| 3 | 2020/04/01 13:10 | FAX TRANSMISSION | TRANSMISSION DESTINATION: 12345, IMAGE QUALITY: NORMAL CHARACTERS, DENSITY: DARK, ...... | 11:11:11:11:11:11 | |
| 4 | 2020/04/02 13:30 | E-mail TRANSMISSION | TRANSMISSION DESTINATION: bbbbb@sample.com, COLOR MODE: BLACK AND WHITE, RESOLUTION: 200x200dpi, FORMAT: TIFF, ...... | | User1 |
| 5 | 2020/04/02 13:40 | E-mail TRANSMISSION | TRANSMISSION DESTINATION: ccccc@sample.com, COLOR MODE: FULL COLOR, RESOLUTION: 400x400dpi, FORMAT: PDF, ...... | 22:22:22:22:22:22 | User1 |
| 6 | 2020/04/02 13:50 | FAX TRANSMISSION | TRANSMISSION DESTINATION: 67890, IMAGE QUALITY: NORMAL CHARACTERS, DENSITY: AUTOMATIC, ...... | 22:22:22:22:22:22 | User1 |
| 7 | 2020/04/03 10:00 | E-mail TRANSMISSION | TRANSMISSION DESTINATION: ddddd@sample.com, COLOR MODE: FULL COLOR, RESOLUTION: 400x400dpi, FORMAT: PDF, ...... | 11:11:11:11:11:11 | User1 |

FIG. 17

| JOB ID (HISTORY ID) | DETERMINATION | LOGIN USER |
|---|---|---|
| 1 | false | ~ |
| 2 | false | ~ |
| 3 | false | ~ |
| 4 | true | User1 |
| 5 | true | User1 |
| 6 | true | User1 |
| 7 | true | User1 |

INFORMATION PROCESSING APPARATUS FOR USING SETTING HISTORY INFORMATION INCLUDING DESTINATION INFORMATION ACQUIRED FROM THE TERMINAL DEVICE AND INFORMATION PROCESSING METHOD

BACKGROUND OF THE INVENTION

Field of the Invention

The present invention relates to an information processing apparatus and the like.

Description of the Background Art

Some information processing apparatuses such as multi-function machines have a function of acquiring destination information such as mail addresses and fax numbers to be managed by terminal devices such as smartphones, tablets, mobile phones, or personal computers. It is known that some of these information processing apparatuses can transmit image data also to a destination that is not managed by the own apparatus by setting destination information acquired from a terminal device to a transmission destination pertaining to a transmission job of the image data, such as, for example, a scan to e-mail function, and a scan to fax function.

By the way, in order to facilitate execution of a job that is the same as or similar to a job that has been executed in the past, an attempt has been made to reuse a setting value pertaining to the job by storing the setting value as setting history information. For example, setting history information is selectably displayed on a display device, and a user can easily execute a job by selecting desired setting history information, and changing a setting value as necessary.

When setting history information is stored after execution of a transmission job, destination information set as a transmission destination is stored as a part of the setting history information. In a case where setting history information including destination information is reused by a user of a terminal device being an acquisition source of the destination information, security problems are less likely to occur. However, the setting history information is also reusable by other users who execute a job by using the information processing apparatus. Therefore, in a case where no security measures are taken, there is a problem that destination information to be managed by the user of the terminal device may be leaked to other users.

To cope with the above-described security problem, for example, Japanese Unexamined Patent Application Publication No. 2016-167764 discloses that when executing a transmission job, an image processing apparatus determines whether settings pertaining to the transmission job are stored as a setting history in response to an instruction by a user.

However, in the technique described in Japanese Unexamined Patent Application Publication No. 2016-167764, each time a user executes a transmission job, the user is required to instruct the image processing apparatus whether to store settings pertaining to the job as a setting history. This may make an operation cumbersome. Further, for example, when a user executes a transmission job by the same settings later, the user wishes to store a setting history for the purpose of reuse, but a user's request that setting information to be managed by the user not be used by other users could not be satisfied.

An object of the present disclosure is to provide an information processing apparatus, and the like that can prevent users other than a user of a terminal device from using setting history information including information acquired from the terminal device, without the need of a special operation.

SUMMARY OF THE INVENTION

In order to solve the above problem, an information processing apparatus according to the present disclosure includes a storage, a controller, and a display. The storage stores setting history information in which identification information of a terminal device is associated with history information pertaining to execution of a job using a destination to be managed by the terminal device. The controller restricts displaying the setting history information on the display, when the information processing apparatus is not in a connected state to the terminal device, and displays the setting history information on the display, when the information processing apparatus is in a connected state to the terminal device, and when the identification information acquired from the terminal device in a connected state matches the identification information associated with the history information.

In addition, an information processing method according to the present disclosure is an information processing method by an information processing apparatus capable of executing a job using a destination to be managed by a terminal device. The method includes storing setting history information in which identification information of the terminal device is associated with history information pertaining to execution of the job; when the information processing apparatus is not in a connected state to the terminal device, restricting displaying the setting history information on a display device; and when the information processing apparatus is in a connected state to the terminal device, and when the identification information acquired from the terminal device in a connected state matches the identification information associated with the history information, displaying the setting history information on the display device.

According to the present disclosure, it is possible to provide an information processing apparatus, and the like that can prevent users other than a user of a terminal device from using setting history information including information acquired from the terminal device, without the need of a special operation.

BRIEF DESCRIPTION OF THE DRAWINGS

FIG. 6 is a diagram illustrating a configuration example of setting history information.

FIG. 8 is a diagram illustrating an example of a display determination result on setting history information.

FIG. 10 is a diagram illustrating an operation example according to the first embodiment.

FIG. 11 is a diagram illustrating an operation example according to the first embodiment.

FIG. 12 is a diagram illustrating an operation example according to the first embodiment.

FIG. 15 is a diagram illustrating a configuration example of setting history information.

FIG. 17 is a diagram illustrating an example of a display determination result on setting history information.

DESCRIPTION OF THE PREFERRED EMBODIMENTS

In the following, embodiments according to the present disclosure are described with reference to the drawings. In the present disclosure, a multifunction machine having a copy function, a scan function, a scan to e-mail function, a scan to fax function, and the like is described as an embodiment of an information processing apparatus. Note that, the following embodiments are examples for describing the present disclosure, and the technical scope of the description defined in the claims is not limited to the following description.

1. First Embodiment

A first embodiment is directed to a multifunction machine capable of executing a job, based on destination information acquired from a terminal device, wherein in a case where below-described identification information acquired from the terminal device matches identification information associated with history information pertaining to execution of a job, setting history information is displayed.

1.1 Functional Configuration

Figure 1:
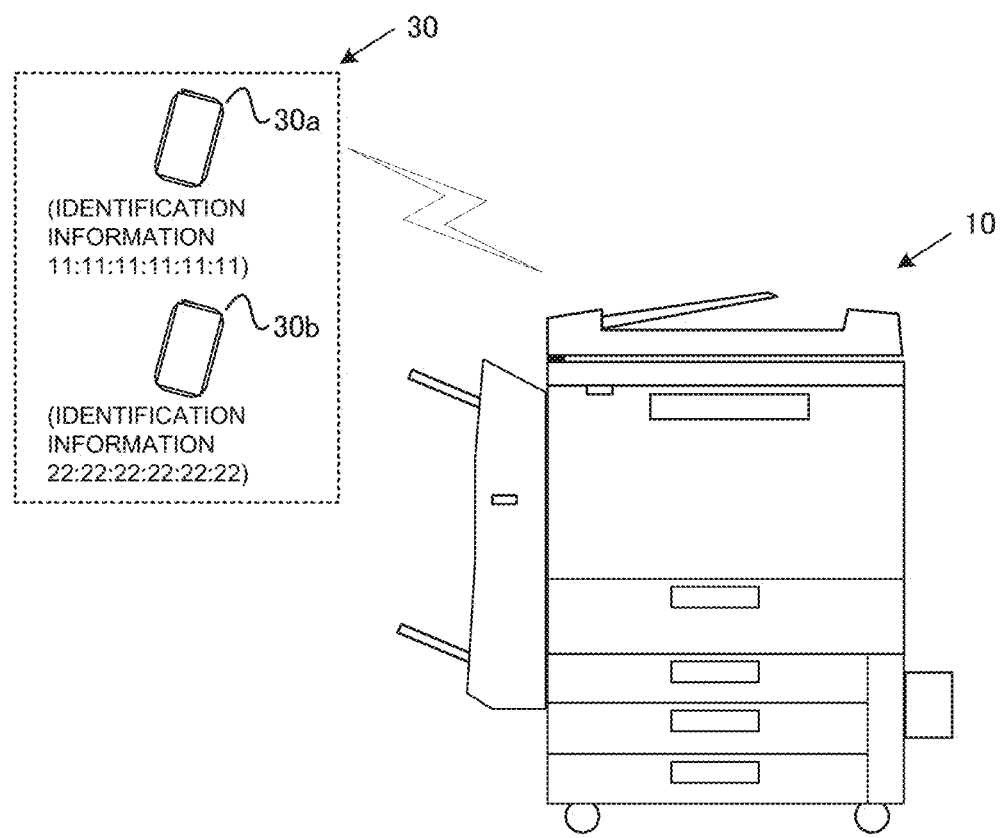
FIG. 1 is a diagram schematically illustrating an overall configuration of a multifunction machine according to a first embodiment.

FIG. 1 is a diagram schematically illustrating an overall configuration of a multifunction machine 10 according to the first embodiment. The multifunction machine 10 is configured to be connectable to a terminal device 30. Note that, in the present disclosure, the term "connection" represents a state in which the multifunction machine 10 and the terminal device 30 establish connection through communication, and are able to mutually transmit and receive information.

Herein, a connection method is not specifically limited, but a communication technique such as, for example, Bluetooth (registered trademark), near field communication (NFC), Wi-fi (registered trademark), ZigBee (registered trademark), Irda, and a wireless USB can be adopted. Note that, FIG. 1 illustrates a configuration in which the multifunction machine 10 is directly connected to the terminal device 30. However, it is also possible to connect through an unillustrated network such as a local area network (LAN), a wide area network (WAN), and the Internet.

The following description is made by using a terminal device 30a (identification information "11:11:11:11:11:11") and a terminal device 30b (identification information "22:22:22:22:22:22") having different pieces of identification information. The terminal device 30a and the terminal device 30b may have a same functional configuration or a different functional configuration, as long as the terminal device 30a and the terminal device 30b have different pieces of identification information. In addition to the above, there is no restriction on the number of terminal devices 30 connectable to the multifunction machine 10. Note that, in a case where there is no need to distinguish between the terminal device 30a and the terminal device 30b, the terminal devices are simply described as terminal devices 30.

Figure 2:
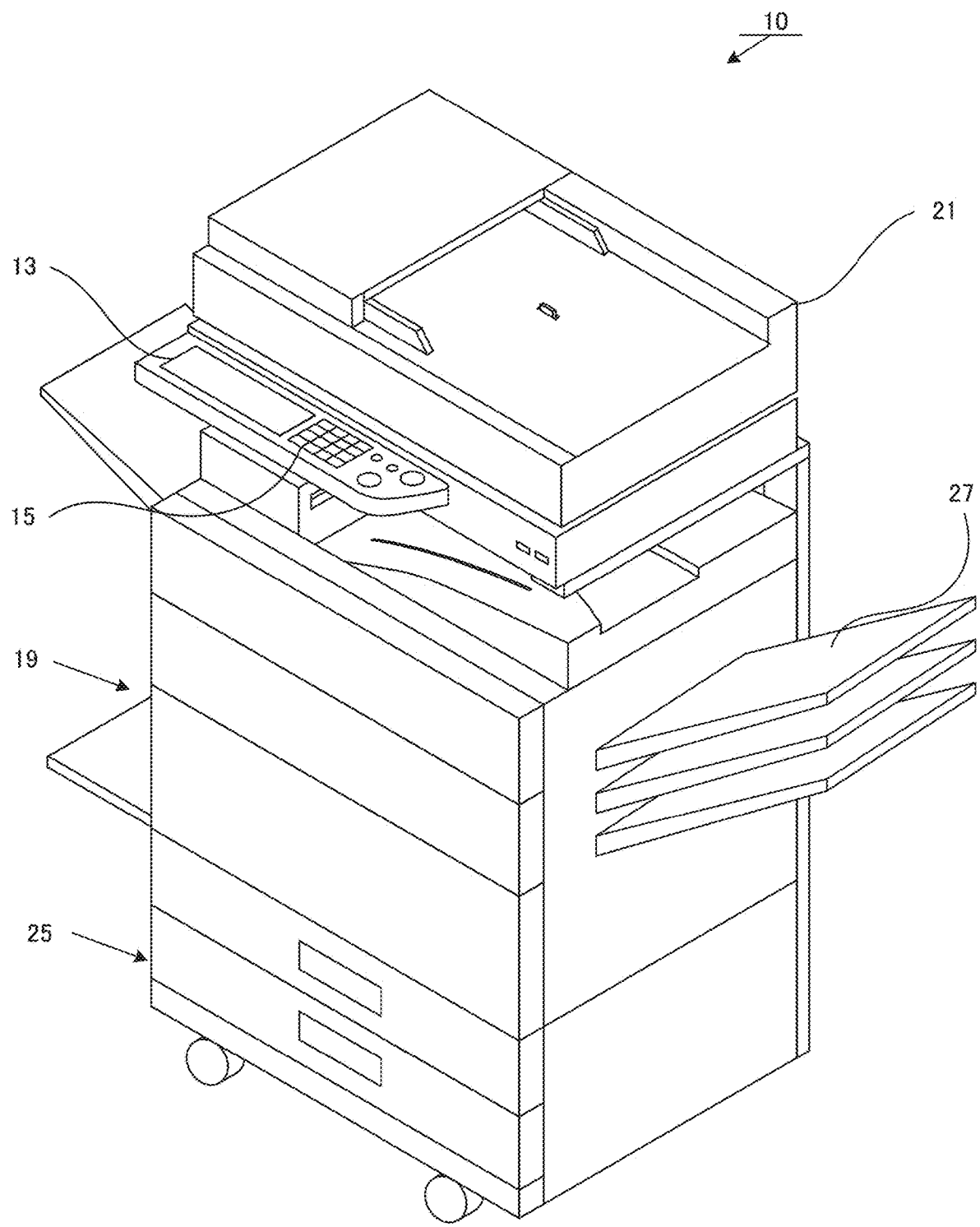
FIG. 2 is an external perspective view illustrating the overall configuration of the multifunction machine according to the first embodiment.
Figure 3:
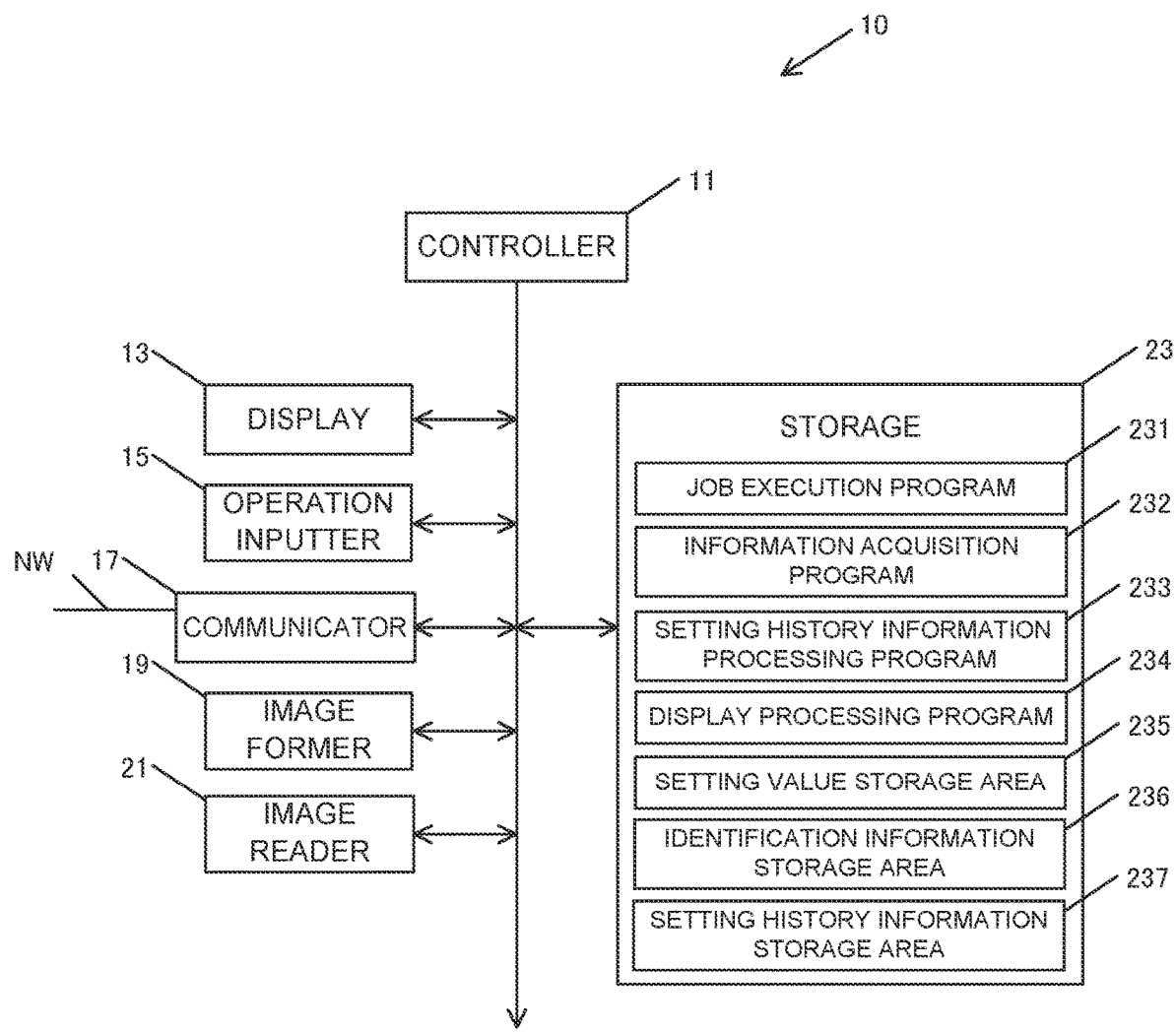
FIG. 3 is a diagram illustrating a functional configuration of the multifunction machine according to the first embodiment.

FIG. 2 is an external perspective view illustrating an overall configuration of the multifunction machine 10. FIG. 3 is a functional configuration diagram of the multifunction machine 10. The multifunction machine 10 includes a controller 11, a display 13, an operation inputter 15, a communicator 17, an image former 19, an image reader 21, and a storage 23.

The controller 11 controls the entirety of the multifunction machine 10. The controller 11 is configured of, for example, one or more arithmetic devices (such as a central processing unit (CPU)). The controller 11 achieves its function by reading and executing various programs stored in the storage 23.

The display 13 displays various pieces of information to a user or others. The display 13 can be configured of, for example, a liquid crystal display (LCD), an organic electroluminescence (EL) display, or the like.

The operation inputter 15 accepts an input of information by a user or others. The operation inputter 15 can be configured of hard keys (e.g., a numeric keypad), buttons, and the like. Note that, the operation inputter 15 can be configured as a touch panel that allows an input via the display 13. In this case, as an input detection method of a touch panel, for example, a method such as a resistive film method, an infrared method, an electromagnetic induction method, and an electrostatic capacitance method can be employed.

The communicator 17 includes, as described above, a wireless communication interface such as Bluetooth, NFC, Wi-fi, ZigBee, Irda, and a wireless USB. In addition to the above, the communicator 17 can also include either one or both of wired/wireless interfaces for communicating with another device via an unillustrated network such as a LAN, a WAN, the Internet, a telephone line, and a fax line.

The image former 19 forms an image based on image data on paper as a recording medium. The image former 19 feeds paper from a paper feeder 25, forms an image based on image data on the paper, and then discharges the paper to a paper discharger 27. The image former 19 can be configured of, for example, a laser printer or the like using an electrophotographic method. The image former 19 performs image formation by using toner supplied from unillustrated toner cartridges associated with toner colors (e.g., cyan (C), magenta (M), yellow (Y), and black (K)).

The image reader 21 generates scan data by scanning and reading a document image to be read. The image reader 21 can be configured, for example, as a scanner device including an image sensor such as a charge coupled device (CCD), and a contact image sensor (CIS). There is no restriction on a configuration of the image reader 21, as long as the image reader 21 is configured to generate scan data by reading a reflected light image from a document image with use of an image sensor.

The storage 23 stores various programs necessary for an operation of the multifunction machine 10, and various pieces of data. The storage 23 can be configured of a storage device such as, for example, a random access memory (RAM), a hard disk drive (HDD), a solid state drive (SSD), and a read only memory (ROM).

In the first embodiment, the storage 23 stores a job execution program 231, an information acquisition program 232, a setting history information processing program 233, and a display processing program 234, and secures a setting value storage area 235, an identification information storage area 236, and a setting history information storage area 237.

The job execution program 231 is a program to be read by the controller 11 to perform processing accompanying execution of a copy function, a scan function, a scan to e-mail function, a scan to fax function, and the like in a unit of a job. The controller 11 controls each part involved in execution of the job by reading the job execution program 231.

The information acquisition program 232 is a program to be read by the controller 11, when acquiring identification information and destination information from the terminal device 30. The controller 11 that has acquired the information acquisition program 232 acquires identification information for uniquely identifying the terminal device 30, and destination information to be managed by the terminal device 30. Note that, there is no restriction on identification information, as long as the identification information can uniquely identify the terminal device 30. For example, a media access control (MAC) address or the like can be used. Further, there is no particular restriction on destination information, as long as the destination information can identify a transmission destination pertaining to a transmission job such as, for example, a mail address or a fax number.

The setting history information processing program 233 is, for example, a program to be read by the controller 11, when performing acquisition of a setting value or the like pertaining to execution of a job, generation of setting history information, and each processing with respect to setting history information. By reading the setting history information processing program 233, the controller 11 acquires a setting value pertaining to execution of a job, generates setting history information, and stores the setting history information in the setting history information storage area 237.

The display processing program 234 is a program to be read by the controller 11, when displaying setting history information, a job execution screen, a login screen for the device, a home screen, or the like. After reading the display processing program 234, the controller 11 acquires unillustrated frame information, content arrangement information, and the like, and displays, for example, a setting history information screen to be described later on the display 13.

The setting value storage area 235 is a storage area for storing setting values pertaining to execution of a job. The setting values include, for example, setting values set by a user, such as a color mode, a document/paper size, a density, an image quality, a resolution, and a format, and setting values such as device default values held by the device itself. Note that, the controller 11 that has read the information acquisition program 232 stores, in the setting value storage area 235, destination information acquired from the terminal device 30, as setting values.

The identification information storage area 236 is a storage area for storing identification information acquired from the terminal device 30. Identification information stored in the identification information storage area 236 is read, when being associated with history information pertaining to job execution, performing identification processing of the terminal device 30, and the like.

The setting history information storage area 237 is a storage area for storing setting history information in a data table format. Setting history information according to the present disclosure can be configured, for example, as history information attached with a job ID for uniquely identifying information, which is configured of combination of information related to an execution history of a job, such as an execution date and time and a type of an executed job, and a part or all of setting values stored in the setting value storage area 235. Note that, setting history information according to the present disclosure may represent history information associated with identification information of the terminal device 30 with respect to the above-described history information, or an execution user to be described later, or may represent history information that is not associated with these pieces of information.

Figure 4:
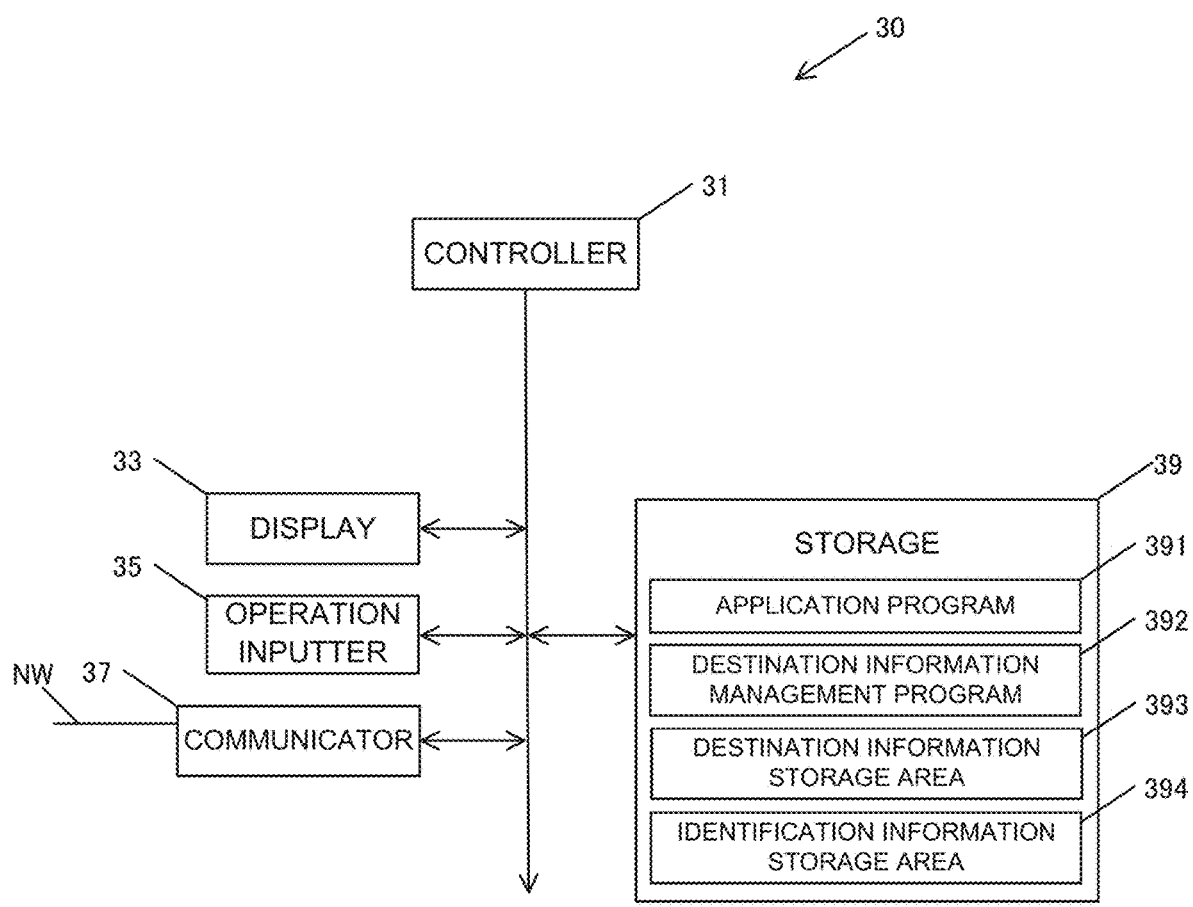
FIG. 4 is a diagram illustrating a functional configuration of a terminal device according to the first embodiment.

FIG. 4 is a diagram illustrating a functional configuration of the terminal device 30. The terminal device 30 according to the present disclosure is a so-called mobile terminal device such as, for example, a smartphone, a tablet, a mobile phone, and a notebook computer, but is not limited thereto. As long as the environment is an environment capable of communicating with the multifunction machine 10, an installation type terminal device such as a desktop personal computer is also included in the terminal device according to the present disclosure.

The terminal device 30 as described above includes a controller 31, a display 33, an operation inputter 35, a communicator 37, and a storage 39.

The controller 31 controls the entirety of the terminal device 30. The controller 31 is configured of, for example, one or more arithmetic devices (such as a CPU). The controller 31 achieves its function by reading and executing various programs stored in the storage 39.

The display 33 displays various pieces of information to a user. The display 33 can be configured of, for example, an LCD, an organic EL display, or the like.

The operation inputter 35 accepts an input of information by a user or others. The operation inputter 35 can be configured as a touch panel that allows an input via the display 33. In this case, as an input detection method of a touch panel, for example, a method such as a resistive film method, an infrared method, an electromagnetic induction method, and a capacitance method can be employed.

The communicator 37 includes a communication interface such as Bluetooth, NFC, Wi-fi, ZigBee, Irda, and a wireless USB. In addition to the above, the communicator 37 can also include either one or both of wired/wireless interfaces for communicating with another device via an unillustrated network such as a LAN, a WAN, the Internet, a telephone line, and a fax line.

The storage 39 stores various programs necessary for an operation of the terminal device 30, and various pieces of data. The storage 39 can be configured of a storage device such as, for example, a RAM, an HDD, an SSD, and a ROM.

In the first embodiment, the storage 39 stores an application program 391 and a destination information management program 392, and secures a destination information storage area 393 and an identification information storage area 394.

The application program 391 is a program to be read by the controller 31, when executing various applications, such as, for example, mails, fax, SNS, calls, video and music viewing, and games.

The destination information management program 392 is a program to be read by the controller 31, when managing destination information such as mail addresses, fax numbers, accounts, and telephone numbers of destinations to be used in applications such as mails, fax, SNS, and calls. The controller 31 performs processing such as new registration, editing, and deletion of destination information, based on an instruction by a user. Further, the controller 31 reads and outputs destination information to be managed in response to a request from the controller 11 of the multifunction machine 10. When a request for acquiring destination information is made based on, for example, a phone book access profile (PBAP) or the like, the controller 31 can export the destination information in a batch manner in a vCard format. Note that, the destination information management program 392 may be implemented as a management program incorporated in the application program 391.

The destination information storage area 393 is, for example, a storage area for storing destination information such as mail addresses, fax numbers, accounts, and telephone numbers in association with identification information such as user names, user IDs, addresses, and company names.

The identification information storage area 394 is a storage area for storing identification information such as MAC addresses.

1.2 Flow of Processing

Figure 5:
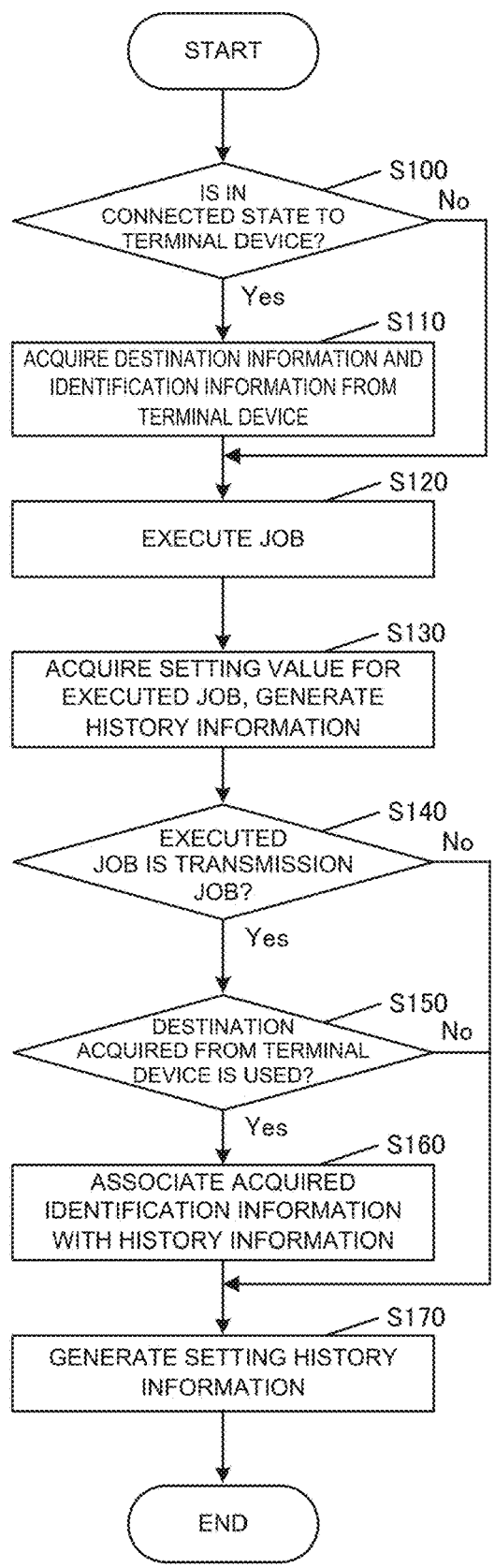
FIG. 5 is a flowchart illustrating a flow of processing according to the first embodiment.

Next, a flow of processing according to the first embodiment is described. FIG. 5 is a flowchart illustrating a flow of processing by the multifunction machine 10. Description herein is made based on a premise that the multifunction machine 10 is mainly connected to the terminal device 30a having identification information "11:11:11:11:11:11".

First, the controller 11 of the multifunction machine 10 determines whether the multifunction machine 10 is in a connected state to the terminal device 30a (Step S100). When it is determined that the multifunction machine 10 is in a connected state to the terminal device 30a, the controller 11 acquires destination information and identification information from the terminal device 30a (Step S100; Yes→Step S110).

The controller 11 executes a job at a timing such as at a time when an instruction to execute the job is received (Step S120). When the job is executed, the controller 11 acquires setting values pertaining to the executed job, and generates history information pertaining to the executed job (Step S130).

Next, the controller 11 determines whether the executed job is a transmission job (Step S140). When the executed job is a transmission job, the controller 11 determines whether a destination acquired from the terminal device 30a is used for the transmission job (Step S140; Yes→Step S150).

When the destination acquired from the terminal device 30a is used for the transmission job, the controller 11 associates identification information acquired in Step S110 with history information generated in Step S130 (Step S160), thereby generating setting history information (Step S170). When the controller 11 generates the setting history information, the controller 11 terminates the processing.

On the other hand, when the executed job is not a transmission job (Step S140; No), and when destination information acquired from the terminal device 30a is not used for the transmission job (Step S150; No), the controller 11 generates setting history information without associating identification information (Step S170). When the controller 11 generates the setting history information, the controller 11 terminates the processing.

FIG. 6 is a diagram illustrating a configuration example of setting history information. For example, the job ID "1" represents an executed job in which a job type is "copy", and an execution date and time is "April 01, 2020, 9;00". Setting values are, for example, setting values pertaining to job execution stored in the setting value storage area 235, such as a color mode, a document/paper size, a magnification, a density, an image quality, a resolution, and a format. The job ID "1" includes setting values such as a color mode: full color, a document size: A4, a paper size: A4, and a magnification: 100 (equal size). Note that, setting values illustrated in FIG. 6 are only an example, and setting values in the present disclosure are not limited only to those illustrated in FIG. 6.

Identification information indicates identification information of the terminal device 30 that is acquired from the terminal device 30 and stored in the identification information storage area 236. Note that, a job having the job ID "1" is not a transmission job, but a copy job. Therefore, no identification information is associated with the job ID "1".

The job ID "2", which is an example of a transmission job, has a job type "e-mail transmission", and represents a job executed on "April 01, 2020, 11:00". The job ID "2" includes destination information "aaaaa@sample.com", in addition to setting values such as a color mode: full color, a resolution: 200×200 dpi, and a format: PDF.

The job ID "2" is associated with identification information "11:11:11:11:11:11". This means that a job type pertaining to the job ID "2" is a transmission job "e-mail transmission" (Step S140; Yes in FIG. 5), destination information (aaaaa@sample.com) acquired from the terminal device 30a having identification information "11:11:11:11:11:11" is used as a destination for e-mail transmission (Step S150; Yes in FIG. 5), and identification information is associated with the history information (Step S160 in FIG. 5).

The job ID "3", which is another example of a transmission job, has a job type "fax transmission", and represents a job executed on an execution date and time "April 01, 2020, 13:10". The job ID "3" includes destination information "12345", in addition to setting values such as an image quality: normal characters, and a density: dark.

The job ID "3" is also associated with identification information "11:11:11:11:11:11". As well as the job ID "2", since destination information (12345) acquired from the terminal device 30a is used as a destination for fax transmission, identification information is associated with the history information.

The job ID "4" has a job type "e-mail transmission", and represents a job executed on an execution date and time "April 02, 2020, 13:30". The job ID "4" includes destination information "bbbbb@sample.com", in addition to setting values such as a color mode: black and white, a resolution: 200×200 dpi, and a format: TIFF.

The job ID "4" is not associated with identification information. This is an example in which identification is not associated, since destination information (bbbbb@sample.com) used as a destination is not derived from destination information acquired from the terminal device 30 (for example, is derived from destination information or the like to be managed by the multifunction machine 10 itself).

The job ID "5", which is an example of a transmission job, has a job type "e-mail transmission", and represents a job executed on an execution date and time "April 02, 2020, 13:40". The job ID "5" includes destination information "ccccc@sample.com" in addition to setting values such as a color mode: full color, a resolution: 400×400 dpi, and a format: PDF.

The job ID "5" is associated with identification information "22:22:22:22:22:22". This means that a job type pertaining to the job ID "5" is a transmission job "e-mail transmission", and identification information is associated with the history information, since destination information (ccccc@sample.com) acquired from the terminal device 30*b* having identification information "22:22:22:22:22:22" is used as a destination for e-mail transmission.

Likewise, the job ID "6" represents a job, in which identification information is associated with the history information, since destination information (67890) acquired from the terminal device 30*b* is used as a destination for fax transmission.

Next, display processing of setting history information is described with reference to a flowchart in FIG. 7. The present processing is processing to be performed with respect to setting history information stored in the setting history information storage area 237.

Upon receiving an instruction to display setting history information, the controller 11 determines whether identification information is associated with history information (Step S180). When identification information is associated, the controller 11 determines whether the multifunction machine 10 is in a connected state to the terminal device 30 (Step S180; Yes→Step S190).

Herein, when the multifunction machine 10 is in a connected state to the terminal device 30, the controller 11 acquires identification information from the terminal device 30 (Step S190; Yes→Step S200). Then, the controller 11 determines whether the acquired identification information matches the identification information associated with the history information (Step S210).

When the identification information matches, the controller 11 sets display determination to "true" (Step S210; Yes→Step S220).

By the way, when no identification information is associated, the controller 11 sets display determination to "true" (Step S180; No→Step S220). On the other hand, when the multifunction machine 10 is not in a connected state to the terminal device 30 (Step S190; No), and when the identification information does not match (Step S210; No), the controller 11 sets display determination to "false" (Step S230).

The controller 11 displays, on the display 13, setting history information in which display determination is set to "true" (Step S240), and terminates the processing.

Figure 7:
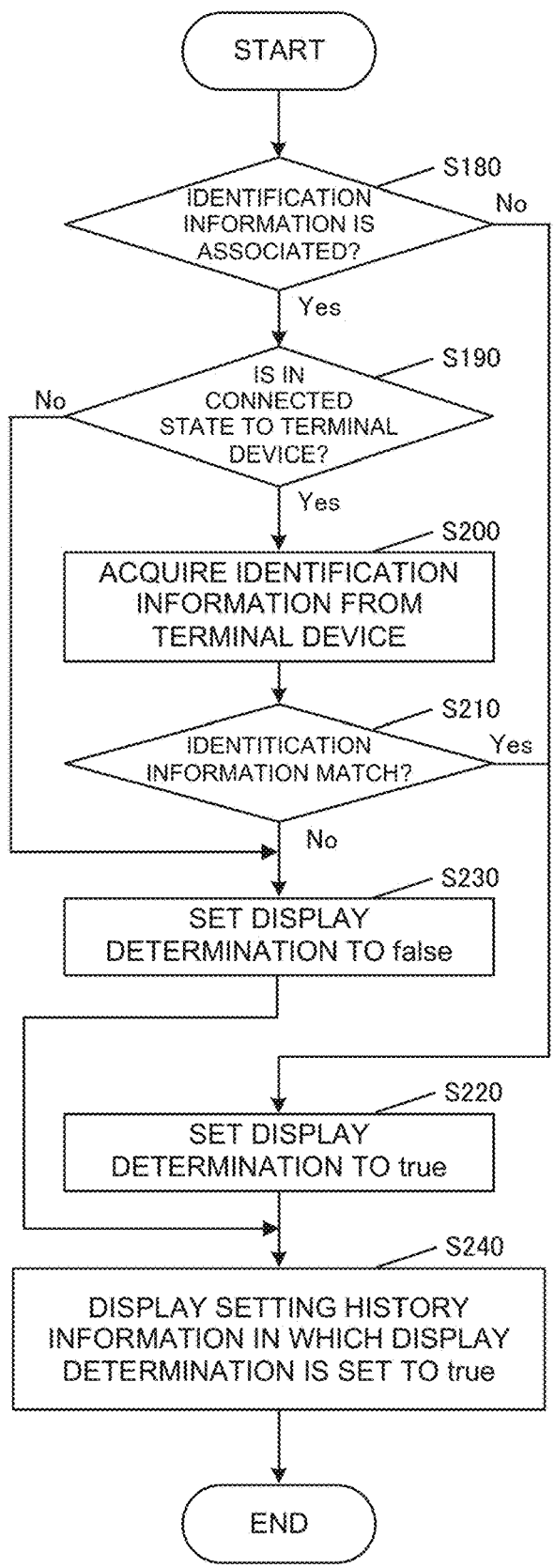
FIG. 7 is a flowchart illustrating a flow of processing according to the first embodiment.

FIG. 8 is a table illustrating an example of a display determination result on setting history information based on processing illustrated in FIG. 7. FIG. 8 illustrates a display determination result in a case where a connection target is the terminal device 30*a* having identification information "11:11:11:11:11:11".

The job ID "1" has a job type "copy", which is not a transmission job. Therefore, no identification information is associated with history information pertaining to the job ID "1" (Step S180; No→Step S220 in FIG. 7). Accordingly, the controller 11 determines display determination to be "true" (Step S220). Likewise, the job ID "4" has a job type "e-mail transmission", but identification information is not associated with history information. Therefore, the controller 11 determines display determination to be "true" (Step S180; No→Step S220 in FIG. 7).

In addition, the job IDs "2", "3", and "7" represent jobs executed by the terminal device 30*a* (Step S210; Yes→Step S220). Therefore, the controller 11 determines display determination to be "true" (Step S220).

On the other hand, the job IDs "5" and "6" represent jobs executed by the terminal device 30*b* (Step S210; No→Step S230). Therefore, the controller 11 determines display determination to be "false" (Step S230).

The controller 11 displays, on the display 13, setting history information pertaining to the job IDs "1", "2", "3", "4", and "7", when the multifunction machine 10 is in a connected state to the terminal device 30*a*, based on the above-described determination result.

1.3 Operation Example

Next, an operation example according to the first embodiment is described. FIGS. 9, 10, 11, and 12 illustrate a configuration example of a setting history information screen to be displayed by the multifunction machine 10. Note that, the present operation example is equivalent to an operation example associated with processing of Step S240 in FIG. 7.

Figure 9:
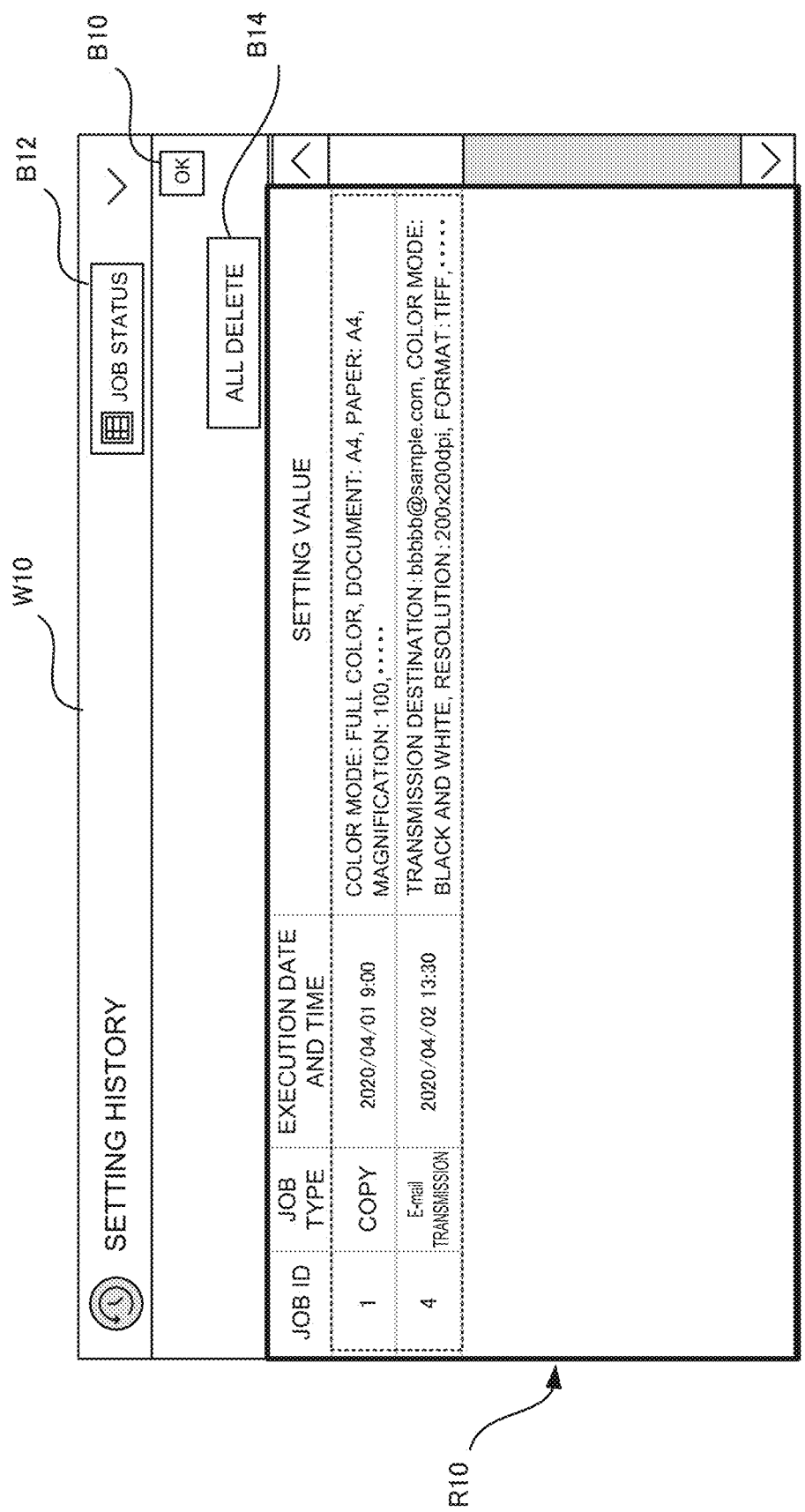
FIG. 9 is a diagram illustrating an operation example according to the first embodiment.

FIG. 9 illustrates a configuration of a setting history information screen W10 to be displayed by the multifunction machine 10, when the multifunction machine 10 is not in a connected state to the terminal device 30. The setting history information screen W10 includes a setting history information display area R10, an OK button B10, a job status display button B12, and an all delete button B14.

The setting history information display area R10 is an area for displaying setting history information. The controller 11 displays setting history information in the setting history information display area R10, based on a determination processing result in FIG. 8 depending on a connection status to the terminal device 30.

In the present operation example, since the multifunction machine 10 is not in a connected state to the terminal device 30, the controller 11 displays only setting history information pertaining to the job IDs "1" and "4" among the setting history information illustrated in FIG. 6 (within the dotted line frame in FIG. 9).

The OK button B10 is a button that accepts an input of an instruction for approval by the user. Processing after the input of an instruction for approval accompanying pressing of the OK button B10 can be set as necessary. For example, when the OK button B10 is pressed while specific setting history information is selected, the controller 11 can control a screen to shift to a job execution screen pertaining to selected setting history information. Further, when the OK button B10 is pressed while no specific setting history information is selected, the controller 11 may control a screen to shift to a home screen (basic screen) of the multifunction machine 10.

The job status display button B12 is a button that accepts an instruction to display a job execution status, a reservation/cancellation status, and other information.

The all delete button B14 accepts an instruction to hide all pieces of setting history information displayed in the setting history information display area R10. In response to pressing of the all delete button B14, the controller 11 stops displaying setting history information displayed in the setting history information display area R10.

FIG. 10 illustrates a configuration of a setting history information screen W12 to be displayed by the multifunction machine 10, when the multifunction machine 10 is in a connected state to the terminal device 30a. A configuration of the setting history information screen W12 can be made the same as that of the setting history information screen W10. Therefore, description on a screen configuration is omitted, and differences in a display content in the setting history information display area R10 are described.

In the present operation example, since the multifunction machine 10 is in a connected state to the terminal device 30a, the controller 11 displays setting history information pertaining to the job IDs "2", "3", and "7" in chronological order, in addition to the job IDs "1" and "4" among the setting history information illustrated in FIG. 6 (within the dotted line frame in FIG. 10).

In this case, since jobs pertaining to the job IDs "2" and "3" are executed during a period between the job ID "1" (execution date and time "April 01, 2020, 09:00") and the job ID "4" (execution date and time "April 02, 2020, 13:30"), the job IDs "2" and "3" are displayed to be located between the job IDs "1" and "4". Further, a job pertaining to the job ID "7", which has the latest job execution date and time, is displayed following the job ID "4".

FIG. 11 illustrates another configuration example of a setting history information screen to be displayed by the multifunction machine 10, when the multifunction machine 10 is in a connected state to the terminal device 30a.

A setting history information screen W14 illustrated in FIG. 11 has a configuration in which a job pertaining to the terminal device 30b other than the terminal device 30a in a connected state is also displayed. Jobs pertaining to the terminal device 30b having identification information "22: 22:22:22:22:22" are an e-mail transmission job pertaining to the job ID "5" and a fax transmission job pertaining to the job ID "6".

In this case, destination information (e-mail transmission destination) pertaining to the job ID "5" and destination information (fax transmission destination) pertaining to the job ID "6" are displayed in a confidential manner with a predetermined mark (for example, "*"). As described in the present configuration example, by displaying setting history information with destination information being hidden, it is possible to execute a job that reuses setting values pertaining to the setting history information, while ensuring security against leakage of the destination information. Note that, destination information can also be completely hidden with a predetermined mark, partially hidden, or not displayed at all, as illustrated in FIG. 11.

FIG. 12 illustrates a configuration example of a setting history information screen W16 to be displayed by the multifunction machine 10, when the multifunction machine 10 is in a connected state to the terminal device 30b. A configuration of the setting history information screen W16 can be made the same as that of the setting history information screen W10. Therefore, description on a screen configuration is omitted, and differences in a display content in the setting history information display area R10 are described.

In the present configuration example, since the multifunction machine 10 is in a connected state to the terminal device 30b, the controller 11 displays setting history information pertaining to the job IDs "5" and "6" in chronological order, in addition to the job IDs "1" and "4" among the setting history information illustrated in FIG. 6 (within the dotted line frame in FIG. 12).

In this case, since jobs pertaining to the job ID "5" (execution date and time "April 02, 2020, 13:40") and the job ID "6" (execution date and time "April 02, 2020, 13:50") are executed later than the job ID "4" (execution date and time "April 02, 2020, 13:30"), the jobs IDs "5" and "6" are displayed following the job ID "4".

As described above, according to the first embodiment, it is possible to prevent users other than a user of a terminal device from using setting history information including destination information acquired from the terminal device, without the need of a special operation.

2. Second Embodiment

A second embodiment is directed to a multifunction machine capable of executing a job, based on destination information acquired from a terminal device, wherein in a case where identification information acquired from the terminal device matches identification information associated with history information pertaining to execution of a job, and a login user of the multifunction machine is an execution user of the job, the setting history information is displayed.

2.1 Functional Configuration

Figure 13:
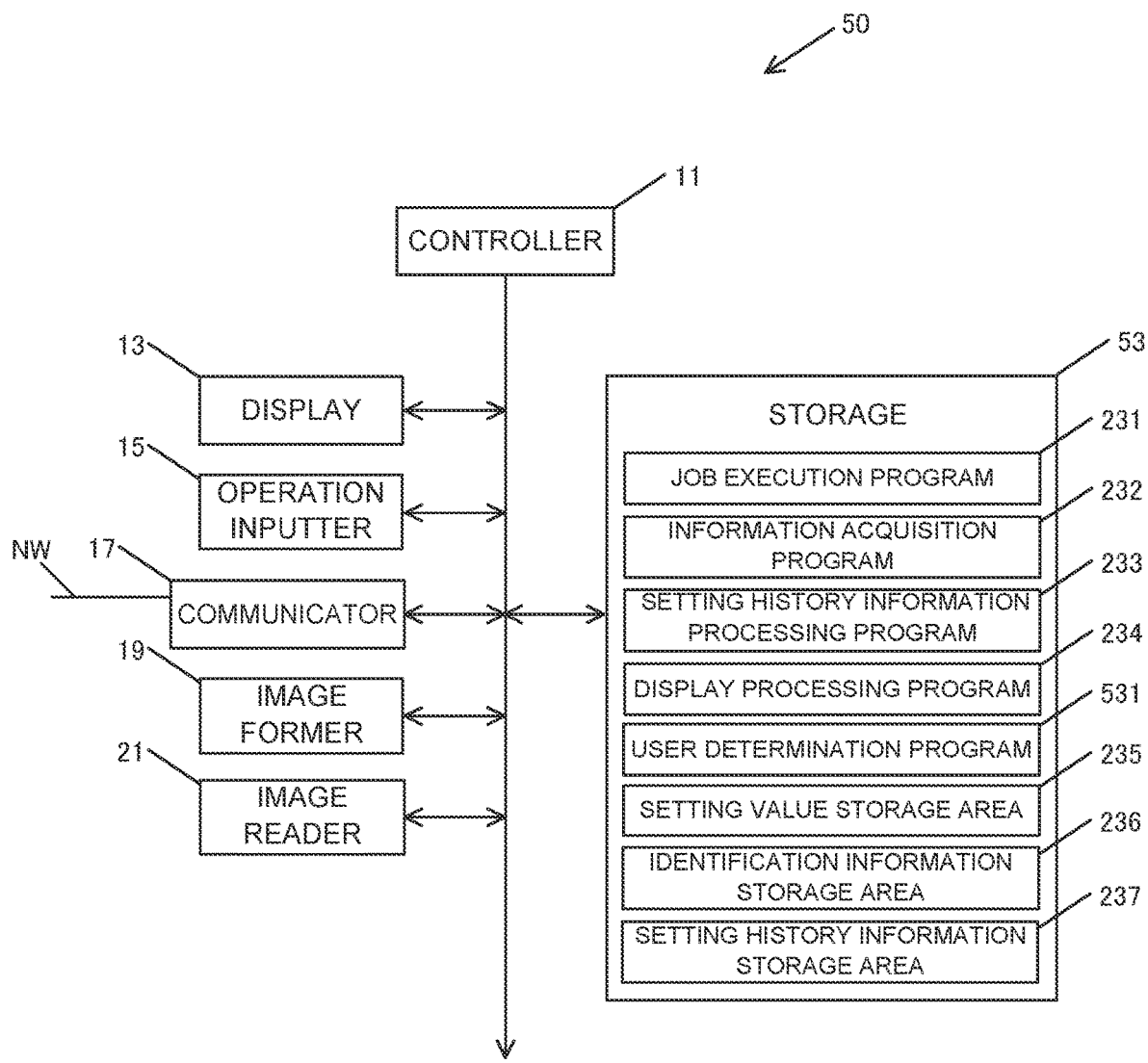
FIG. 13 is a diagram illustrating a functional configuration of a multifunction machine according to a second embodiment.

FIG. 13 is a functional configuration diagram illustrating a functional configuration of a multifunction machine 50 according to the second embodiment. Note that, a same component as that of the multifunction machine 10 according to the first embodiment is indicated with a same reference sign, and description thereof may be omitted.

The multifunction machine 50 includes a controller 11, a display 13, an operation inputter 15, a communicator 17, an image former 19, an image reader 21, and a storage 53.

In the second embodiment, the storage 53 stores a job execution program 231, an information acquisition program 232, a setting history information processing program 233, a display processing program 234, and a user determination program 531, and secures a setting value storage area 235, an identification information storage area 236, and a setting history information storage area 237.

The user determination program 531 is a program to be read by the controller 11, when determining whether a login user for the multifunction machine 50, and an execution user associated with history information are the same. The controller 11 reads the user determination program 531, thereby determining whether a login user for the multifunction machine 50 and an execution user associated with history information are the same.

2.2 Flow of Processing

Figure 14:
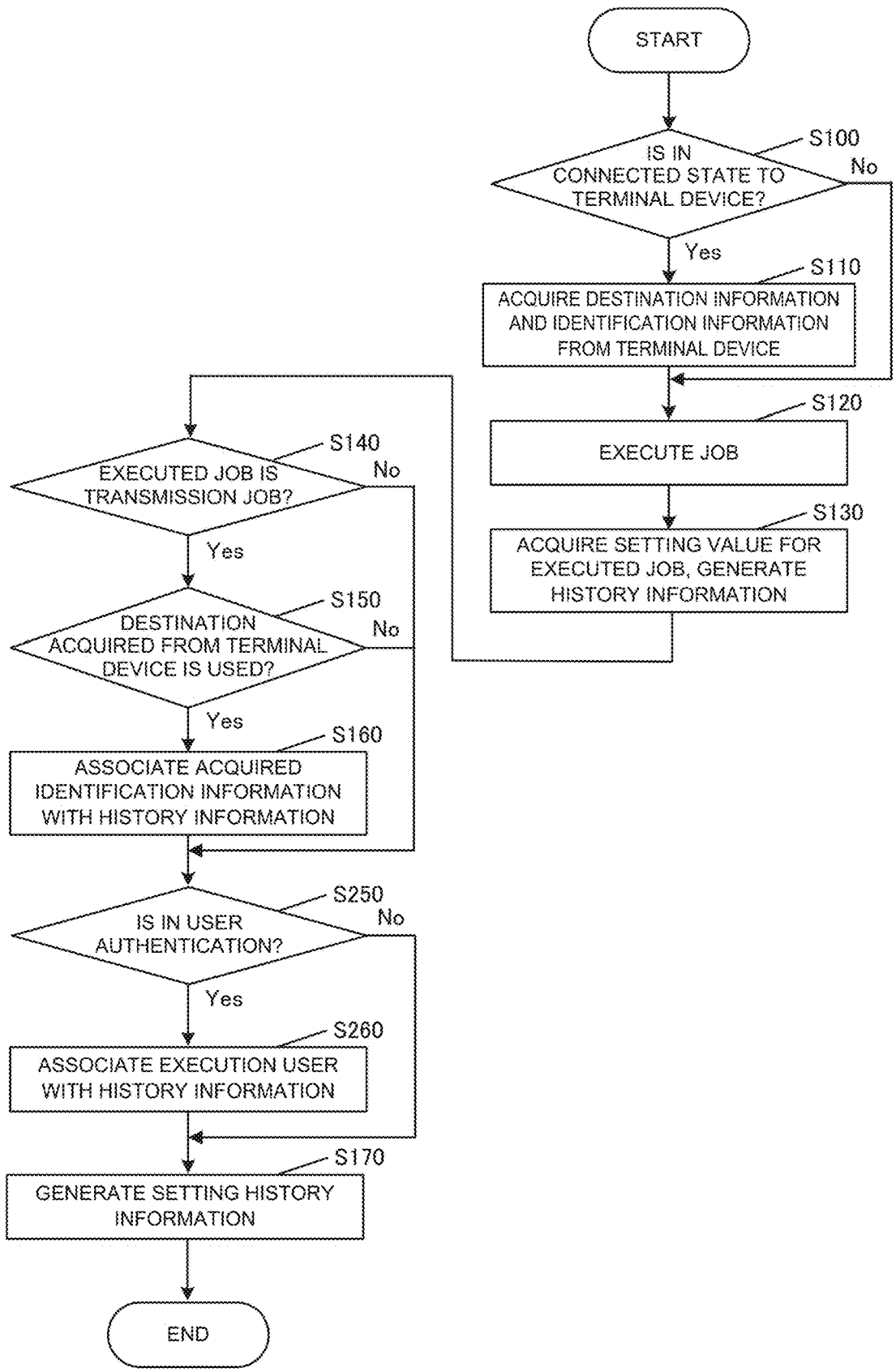
FIG. 14 is a flowchart illustrating a flow of processing according to the second embodiment.

Next, a flow of processing according to the second embodiment is described. FIG. 14 is a flowchart illustrating a flow of processing according to the second embodiment.

Note that, a part of processing according to the second embodiment can be performed in the same manner as processing from Step S100 to Step S170 illustrated in the flowchart in FIG. 5. Therefore, herein, parts different from the flowchart in FIG. 5 are described.

After associating identification information acquired in Step S110 with history information generated in Step S130, the controller 11 determines whether an execution user of a job is under authentication (Step S160→Step S250).

When the execution user is under authentication (Step S250; Yes), the controller 11 associates user information with history information (Step S260), thereby generating setting history information (Step S170). When the controller 11 generates the setting history information, the controller 11 terminates the processing.

FIG. 15 is a diagram illustrating a configuration example of setting history information. Setting history information according to the second embodiment is the one in which an execution user is further associated with history information illustrated in FIG. 6.

FIG. 15 illustrates a configuration example of setting history information generated by associating the execution user "User 1" with the job IDs "4", "5", "6", and "7".

Next, display processing of setting history information is described with reference to a flowchart in FIG. 16. The present processing is processing to be performed with respect to setting history information stored in the setting history information storage area 237.

Upon receiving an instruction to display setting history information, the controller 11 determines whether an execution user is associated with history information (Step S270). When history information is associated, the controller 11 determines whether a login user for the multifunction machine 50, and the execution user associated with the history information match (Step S270; Yes→Step S280).

When the login user and the execution user associated with the history information match, the controller 11 sets display determination to "true" (Step S280; Yes→Step S290).

By the way, when the execution user is not associated, the controller 11 sets display determination to "false" (Step S270; No→Step S300). Also, when the login user and the execution user associated with the history information do not match, the controller 11 sets display determination to "false" (Step S280; No→Step S300).

The controller 11 displays setting history information in which display determination is set to "true" (Step S310), and terminates the processing.

Figure 16:
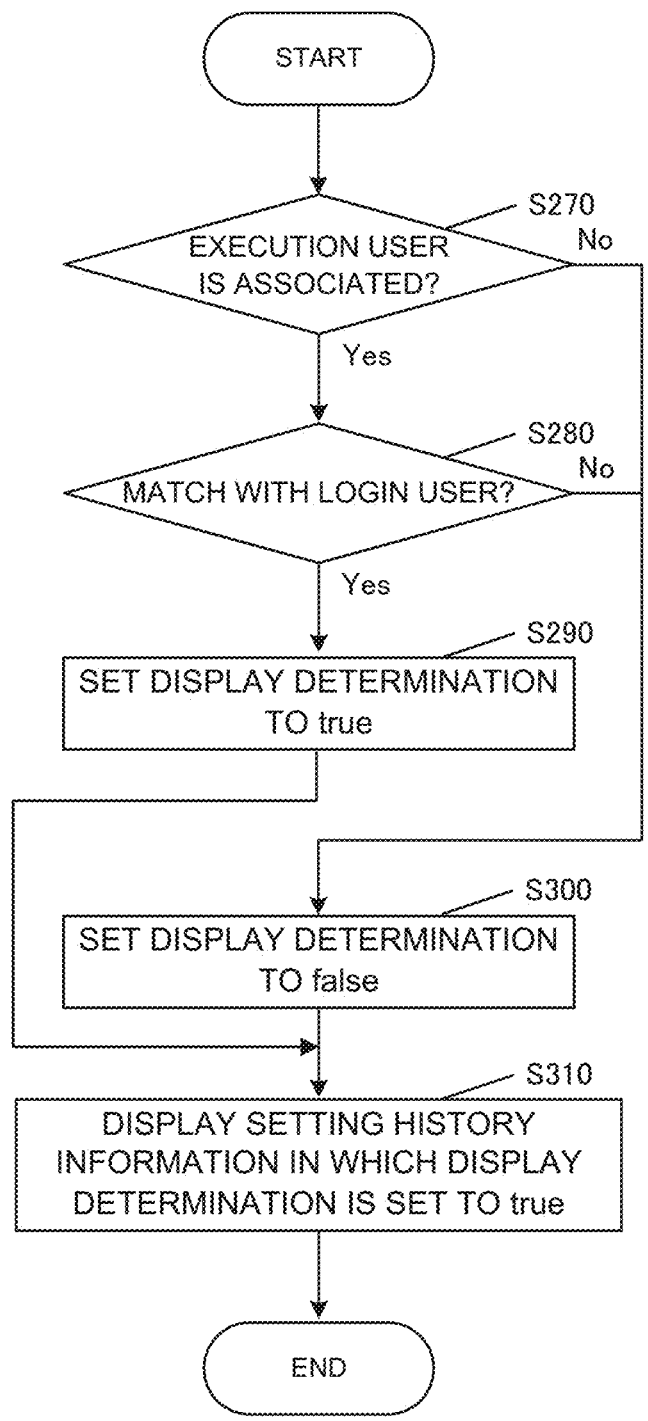
FIG. 16 is a flowchart illustrating a flow of processing according to the second embodiment.

FIG. 17 is a table illustrating an example of a display determination result of setting history information based on processing illustrated in FIG. 16. FIG. 17 illustrates a display determination result when a login user is "User 1".

No execution user is associated with history information pertaining to the job IDs "1", "2", and "3" (Step S270; No→Step S300 in FIG. 16). Therefore, the controller 11 determines that display determination is "false" (Step S300).

On the other hand, history information pertaining to the job IDs "4", "5", "6", and "7" is associated with the execution user "User 1" (Step S270; Yes). Further, since the login user "User 1" and the execution user (User 1) associated with the history information match (Step S280; Yes), the controller 11 sets that display determination is "true" (Step S290).

Based on the above-described determination result, the controller 11 displays, on the display 13, setting history information pertaining to the job IDs "4", "5", "6", and "7", when the login user for the multifunction machine 50 is "User 1".

2.3 Operation Example

Figure 18:
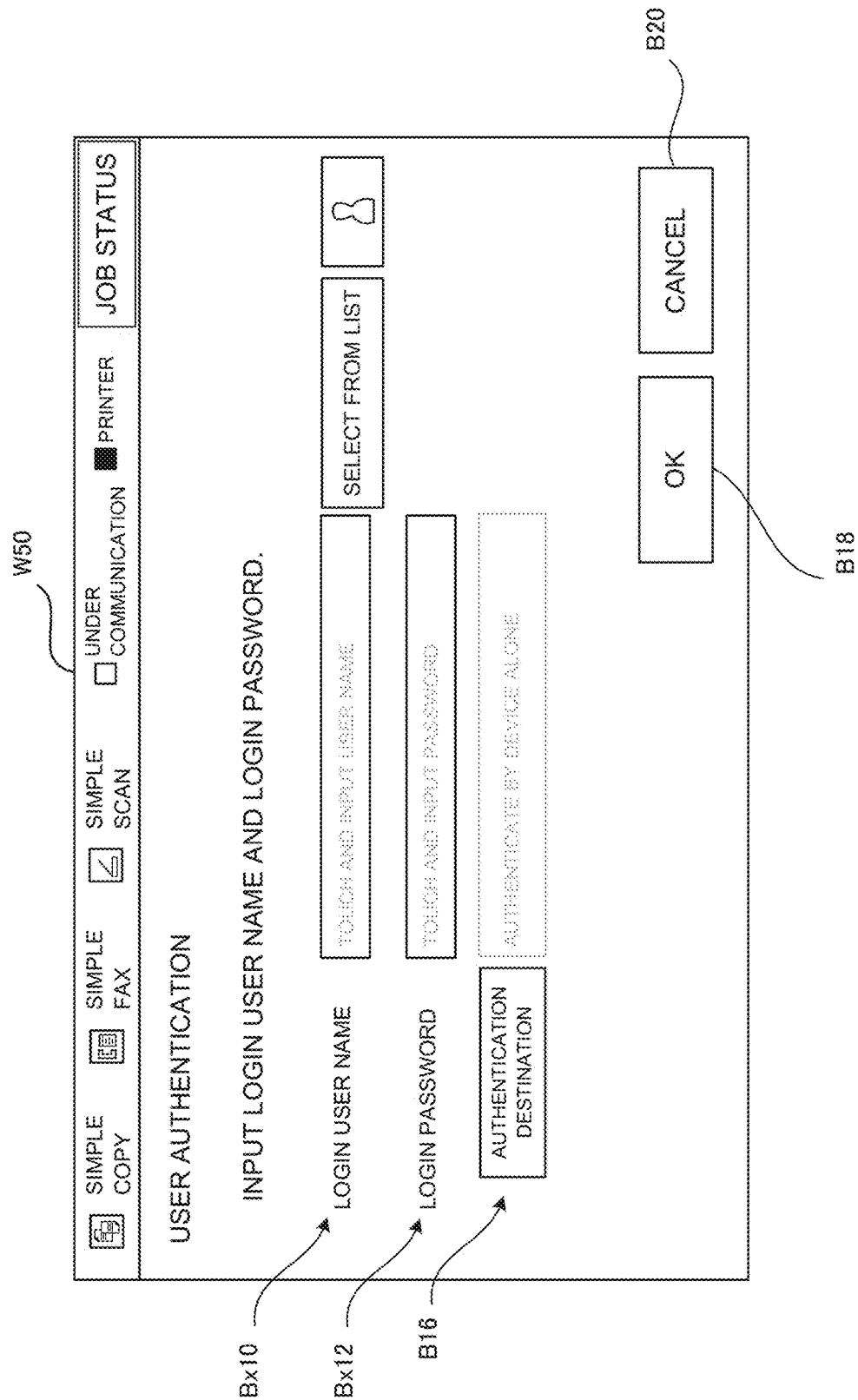
FIG. 18 is a diagram illustrating an operation example according to the second embodiment.

Next, an operation example according to the second embodiment is described. FIG. 18 is a diagram illustrating a configuration example of a user authentication screen for the multifunction machine 50. Note that, in the second embodiment, knowledge authentication using a login user name and a login password is described as user authentication. However, it is also possible to use, for example, property authentication using a token or the like, or biometric authentication such as fingerprint authentication and face authentication.

A user authentication screen W50 is a screen that accepts an input of authentication information for a user who logs in the multifunction machine 50. The user authentication screen W50 includes a login user name input box Bx10, a login password input box Bx12, an authentication destination designation button B16, an OK button B18, and a cancel button B20.

The login user name input box Bx10 is a box that accepts an input of a login user name. A user trying to log in the multifunction machine 50 inputs his or her login user name in the login user name input box Bx10. Note that, a login user name can also be selected from a list.

The login password input box Bx12 is a box that accepts an input of a login password associated with the login user name. A user trying to log in the multifunction machine 50 inputs a login password together with the login user name.

The authentication destination designation button B16 is a button that accepts designation of a user authentication destination. An authentication destination may be a device itself or it may be possible to designate, for example, an authentication server or the like established separately on a network. In a case where authentication by a device itself is designated as an authentication destination, the controller 11 performs user authentication by comparing an input login user name and an input login password with authentication information (for example, combination of a user name and a password) prepared in advance. In a case where an authentication server or the like established on a network is used, the controller 11 can also perform user authentication by transmitting an input login user name and an input login password to the authentication server, and receiving an authentication result from the authentication server.

The OK button B18 accepts an input of an instruction to confirm an input operation by the user. The user presses the OK button B18 to confirm an input to the login user name input box Bx10 and the login password input box Bx12, and designation of an authentication destination via the authentication destination designation button B16. The cancel button B20 accepts an input of an instruction to cancel an input operation by the user.

The user can log in the multifunction machine 50 through an authentication operation via the user authentication screen W50.

Figure 19:
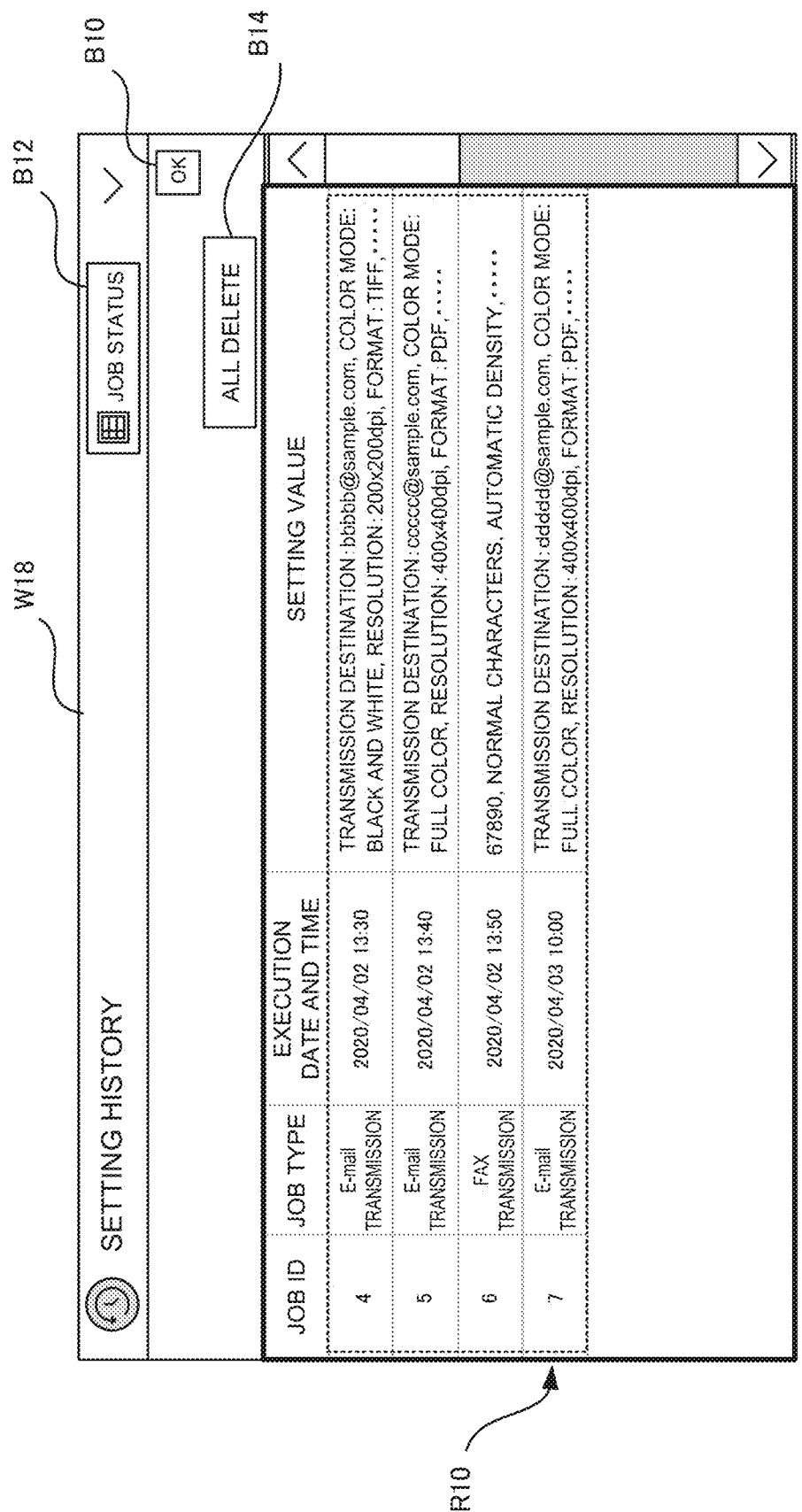
FIG. 19 is a diagram illustrating an operation example according to the second embodiment.

FIG. 19 illustrates a configuration example of a setting history information screen W18 to be displayed by the multifunction machine 50, when the login user (User 1) logs in the multifunction machine 50. A configuration of the setting history information screen W18 can be made the same as that of the setting history information screen W10, or the like. Therefore, description on a screen configuration is omitted, and differences in a display content in the setting history information display area R10 are described.

In the present operation example, since the login user (User 1) logs in the multifunction machine 50, the controller 11 displays setting history information in which an execution user is associated, and the login user (User 1) and the execution user match among the setting history information illustrated in FIG. 15.

Specifically, the controller 11 displays setting history information pertaining to the job IDs "4", "5", "6", and "7" in chronological order (within the dotted line frame in FIG. 19).

As described above, according to the second embodiment, in addition to the advantageous effects of the first embodiment, setting history information is displayed, when a login user of a multifunction machine and an execution user of a job match. Therefore, it is possible to prevent reuse of setting history information in which an execution user is not associated, or setting history information pertaining to a job executed by an execution user different from a login user.

3. Third Embodiment

A third embodiment is directed to a configuration in which a multifunction machine is in a connected state to a terminal device, and displays only setting history information in which identification information acquired from the terminal device matches identification information associated with destination information.

3.1 Functional Configuration

A functional configuration according to the third embodiment can be the same as that of the multifunction machine 50 according to the second embodiment. Therefore, description on the functional configuration is omitted herein.

3.2 Flow of Processing

Figure 20:
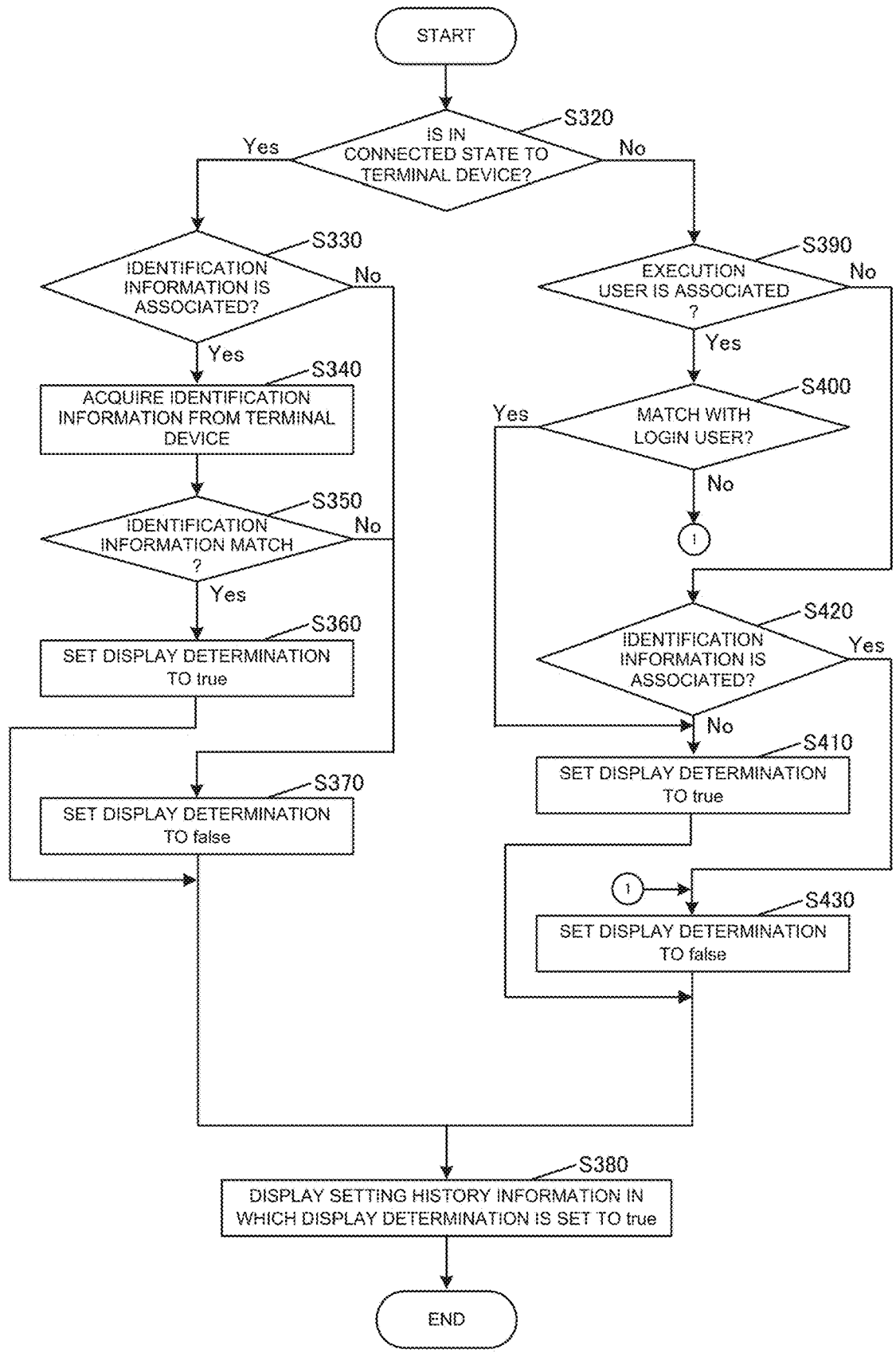
FIG. 20 is a flowchart illustrating a flow of processing according to a third embodiment.

Next, a flow of processing according to the third embodiment is described. FIG. 20 is a flowchart illustrating a flow of processing according to the third embodiment. The present processing is processing to be performed with respect to setting history information stored in a setting history information storage area 237.

Upon receiving an instruction to display setting history information, a controller 11 determines whether a multifunction machine is in a connected state to a terminal device 30 (Step S320).

When the multifunction machine is in a connected state to the terminal device 30, the controller 11 determines whether identification information is associated with history information (Step S320; Yes→Step S330).

When identification information is associated, the controller 11 acquires identification information from the terminal device 30 (Step S330; Yes→Step S340).

Then, the controller 11 determines whether the acquired identification information matches the identification information associated with the history information (Step S350). When the identification information matches, the controller 11 sets display determination to "true" (Step S350; Yes→Step S360).

By the way, when the identification information is not associated (Step S330; No), or when the identification information does not match (Step S350; No), the controller 11 sets display determination to "false" (Step S370).

The controller 11 displays, on a display 13, setting history information in which display determination is set to "true" (Step S380), and terminates the processing.

On the other hand, when the multifunction machine is not in a connected state to the terminal device 30, the controller 11 determines whether an execution user is associated with history information (Step S320; No→Step S390).

When an execution user is associated, the controller 11 determines whether a login user for the terminal device 30 matches the execution user (Step S390; Yes→Step S400).

When the login user and the execution user match, the controller 11 sets display determination to "true" (Step S400; Yes→Step S410). When the login user and the execution user do not match, the controller 11 sets display determination to "false" (Step S400; No→Step S430).

By the way, when the execution user is not associated, the controller 11 determines whether the identification information is associated with the history information (Step S390; No→Step S420).

When the identification information is associated with the history information, the controller 11 sets display determination to "false" (Step S420; Yes→Step S430). On the other hand, when the identification information is not associated with the history information, the controller 11 sets display determination to "true" (Step S420; No→Step S410).

The controller 11 displays, on the display 13, setting history information in which display determination is set to "true", and terminates the processing (Step S380).

3.3 Operation Example

Figure 21:
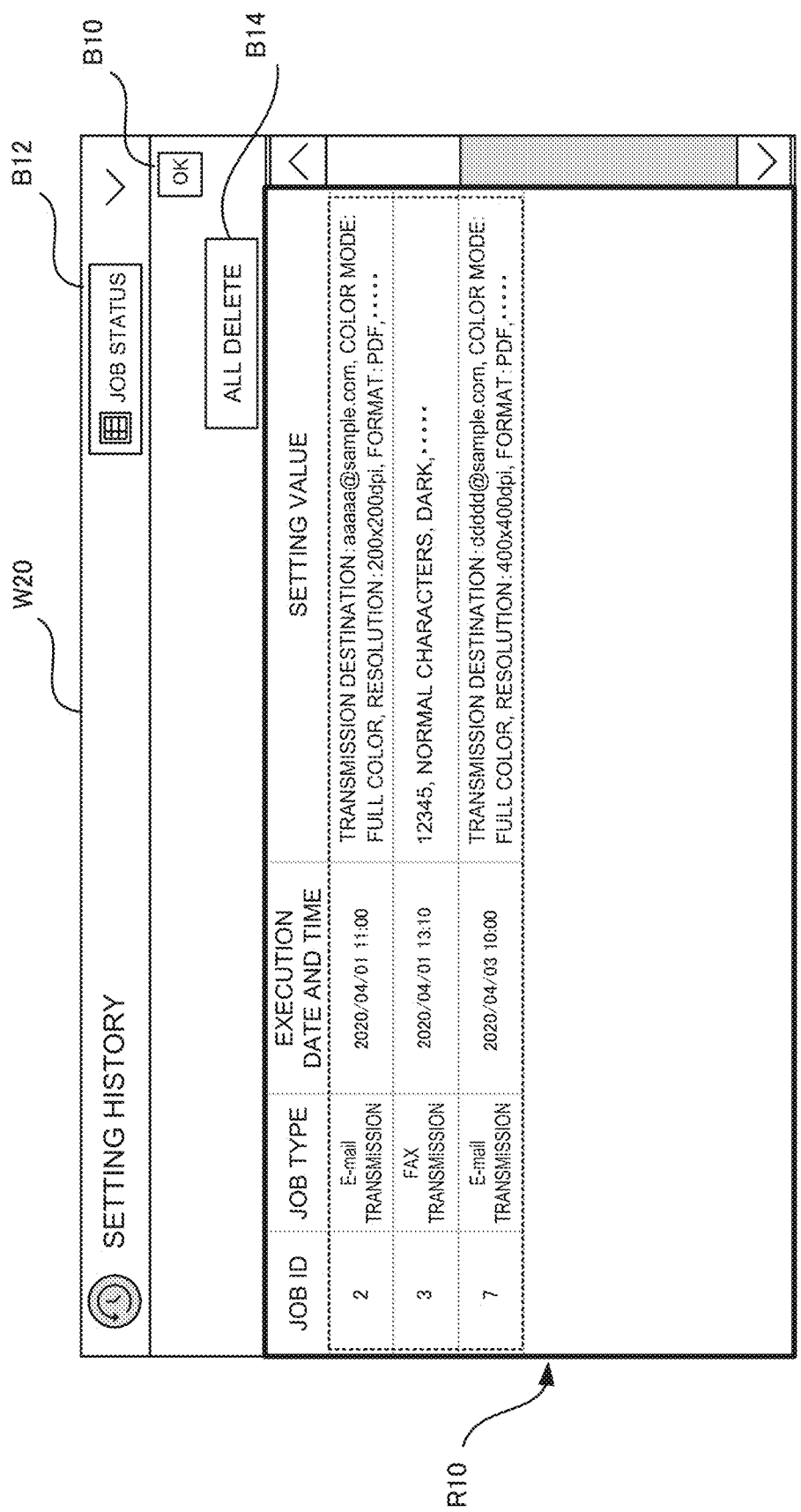
FIG. 21 is a diagram illustrating an operation example according to the third embodiment.

FIG. 21 illustrates a configuration example of a setting history information screen to be displayed by a multifunction machine 50, when the multifunction machine 50 is connected to a terminal device 30a. A configuration of a setting history information screen W20 can be made the same as that of the setting history information screen W10. Therefore, description on a screen configuration is omitted, and differences in a display content in the setting history information display area R10 are described.

In the present operation example, since the multifunction machine 50 is in a connected state to the terminal device 30a, the controller 11 displays only setting history information pertaining to the job IDs "2", "3", and "7" in chronological order among the setting history information illustrated in FIG. 15.

By the way, when the multifunction machine 50 is not in a connected state to the terminal device 30, and the login user and the execution user match (Step S400; Yes→Step S410), only setting history information pertaining to a job executed by the login user is allowed to be displayed. On the other hand, when the login user and the execution user do not match (Step S400; No→Step S410 in FIG. 20), setting history information pertaining to a job executed with use of destination information acquired from the terminal device 30 is not displayed, thereby enabling to prevent leakage of the destination information acquired from the terminal device 30.

As described above, according to the third embodiment, in addition to the advantageous effects of the first embodiment, only setting history information in which identification information acquired from a terminal device matches identification information associated with destination information is displayed. Therefore, it is possible to prevent setting history information in which identification information is not associated, or setting history information in which identification information does not match from being erroneously selected.

4. Fourth Embodiment

A fourth embodiment is directed to a configuration in which security is made more stringent in a multifunction machine according to the first to third embodiments.

4.1 Functional Configuration

Figure 22:
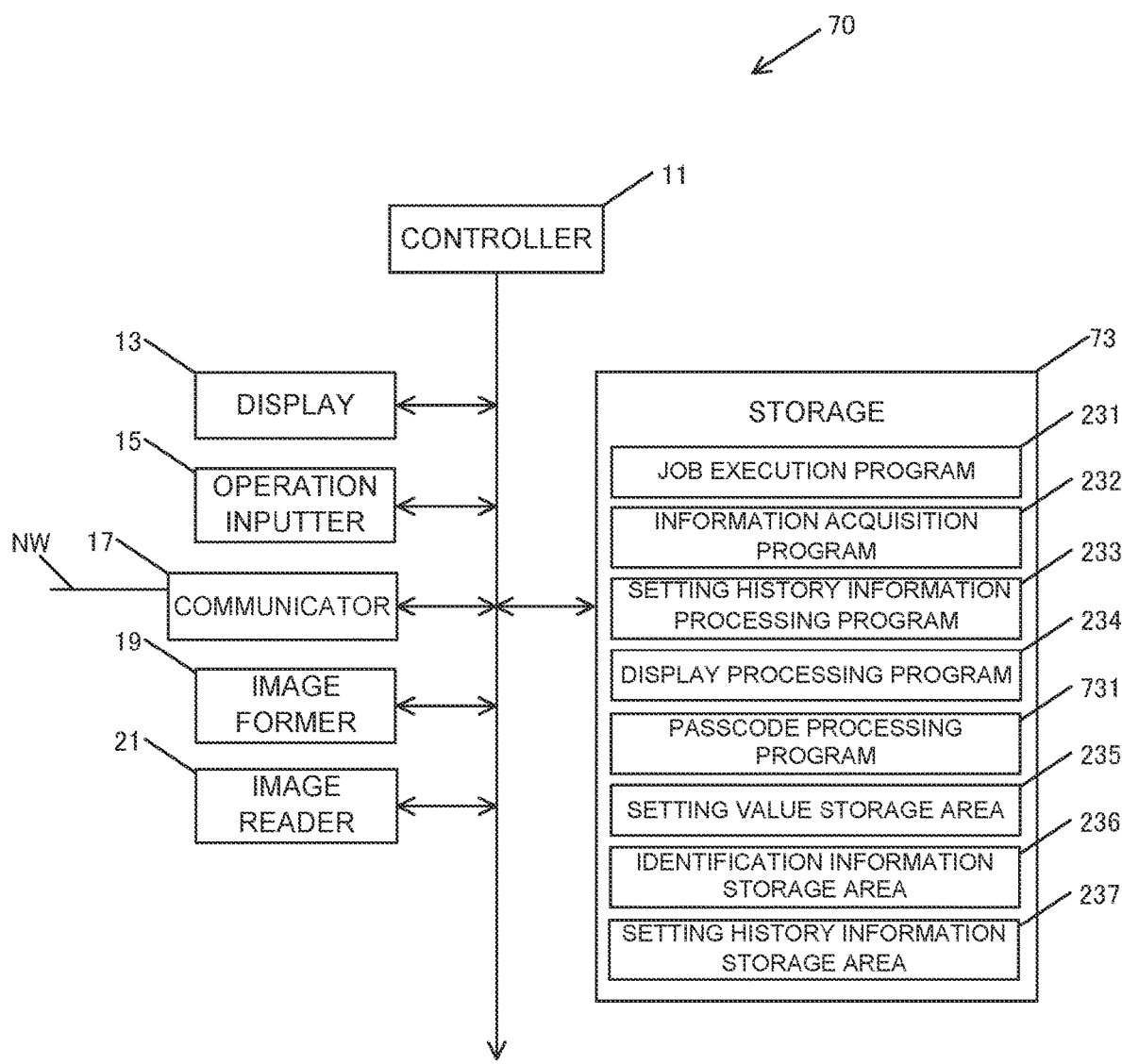
FIG. 22 is a diagram illustrating a functional configuration of a multifunction machine according to a fourth embodiment.

FIG. 22 is a functional configuration diagram illustrating a functional configuration of a multifunction machine 70 according to the fourth embodiment. Note that, a same component as that of the multifunction machine 10 according to the first embodiment is indicated with a same reference sign, and description thereof may be omitted.

The multifunction machine 70 includes a controller 11, a display 13, an operation inputter 15, a communicator 17, an image former 19, an image reader 21, and a storage 73.

In the fourth embodiment, the storage 73 stores a job execution program 231, an information acquisition program 232, a setting history information processing program 233, a display processing program 234, and a passcode processing program 731, and secures a setting value storage area 235, an identification information storage area 236, and a setting history information storage area 237.

The passcode processing program 731 is a program to be read by the controller 11, when performing generation, transmission, input acceptance, authentication, and the like of a passcode pertaining to whether setting history information is to be displayed. By reading the passcode processing program 731, the controller 11 performs a series of processing pertaining to passcode authentication. Note that, a passcode can be configured as any character string in which 4-digit, 6-digit, or other alphanumeric characters, symbols, and the like are combined. For example, it is also possible to use a character string randomly generated by using a random number generation program, or the like. The controller 11 transmits a generated passcode to a terminal device 30, and displays setting history information on the display 13, when an input passcode and the generated passcode match.

4.2 Flow of Processing

Figure 23:
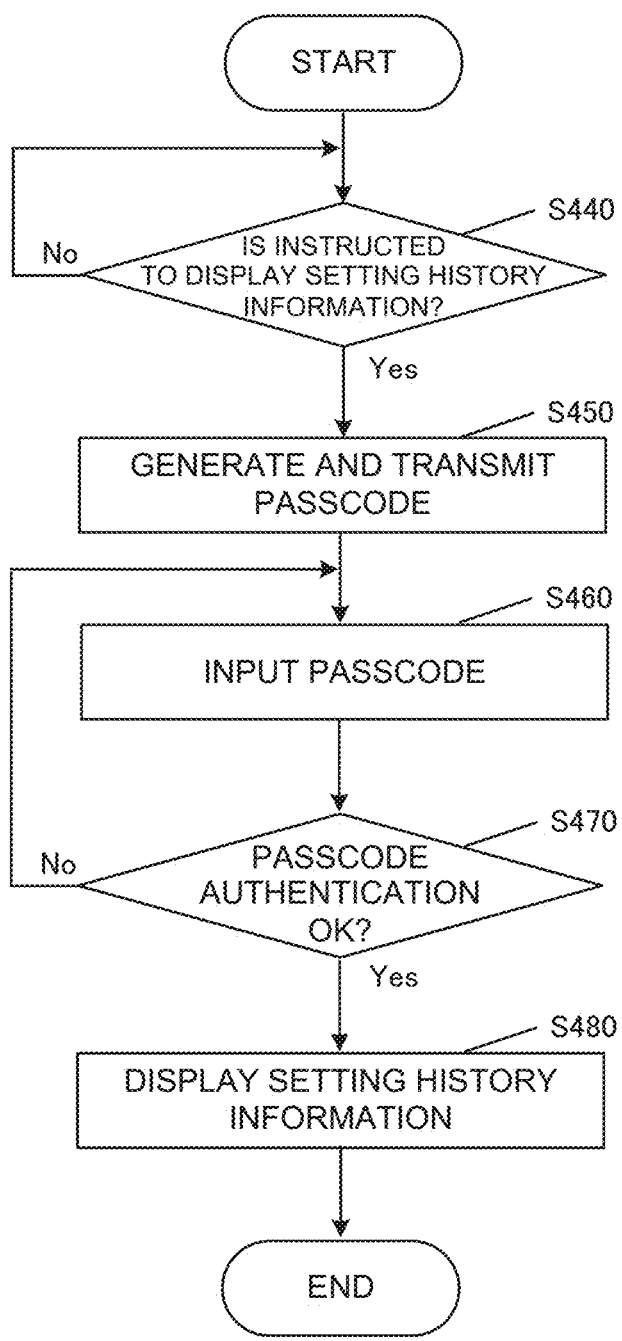
FIG. 23 is a flowchart illustrating a flow of processing according to the fourth embodiment.

Next, a flow of processing according to the fourth embodiment is described. FIG. 23 is a flowchart illustrating a flow of processing according to the fourth embodiment. Note that, processing other than passcode processing illustrated in FIG. 23 can be performed in the same manner as the processing described in the first through third embodiments.

The controller 11 receives an instruction to display setting history information from the terminal device 30 (Step S440). Upon receiving the instruction to display setting history information, the controller 11 generates a passcode, and transmits the passcode to the terminal device 30 (Step S440; Yes→Step S450).

The controller 11 accepts an input of the passcode via a predetermined passcode input screen (Step S460). The controller 11 authenticates the passcode, based on whether the received passcode matches the generated passcode (Step S470).

Once the passcode is authenticated, the controller 11 displays setting history information on the display 13 (Step S470; Yes→Step S480). After displaying the setting history information, the controller 11 terminates the processing. Note that, when the passcode is not authenticated, the controller 11 repeats the processing from receiving a passcode (Step S470; No→Step S460).

4.3 Operation Example

Figure 24:
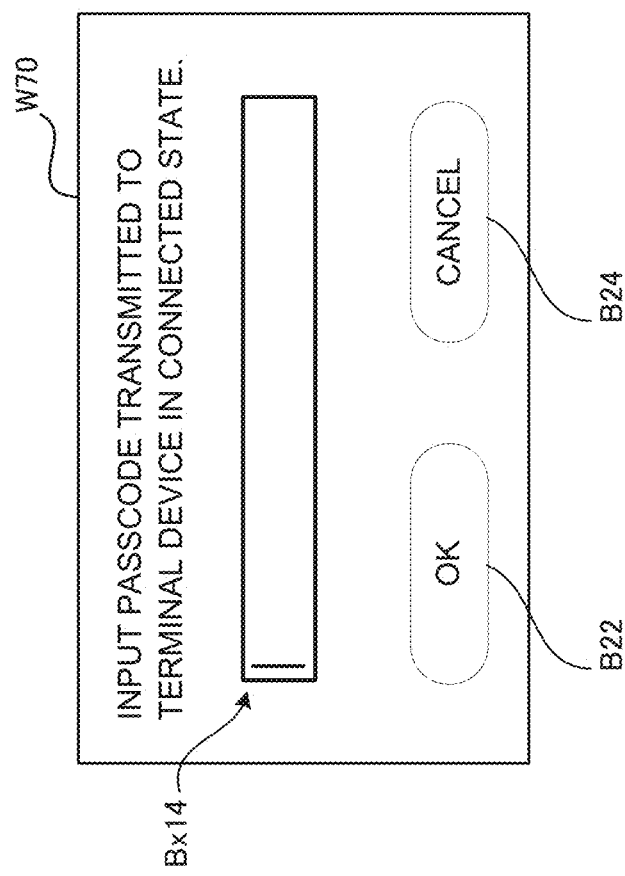
FIG. 24 is a diagram illustrating an operation example according to the fourth embodiment.

FIG. 24 illustrates a configuration example of a passcode input screen W70 to be displayed on the display 13, after the controller 11 that has read the passcode processing program 731 transmits a passcode to the terminal device 30.

The passcode input screen W70 includes a passcode input box Bx14, an OK button B22, and a cancel button B24.

The passcode input box Bx14 is a box that accepts an input of a passcode transmitted to the terminal device 30. A user of the terminal device 30 inputs a passcode received from the multifunction machine 70 to the passcode input box Bx14.

The OK button B22 accepts an input of an instruction to confirm an input operation by the user. The user presses the button, when the user confirms an input of a passcode to the passcode input box Bx14. The cancel button B24 accepts an input of an instruction to cancel an input operation by the user.

The controller 11 displays setting history information, when the passcode accepted via the passcode input screen W70 matches the generated passcode. Note that, when no passcode is input, or a wrong passcode is input, the controller 11 does not display setting history information pertaining to a job executed by using destination information acquired from the terminal device 30.

As described above, according to the fourth embodiment, in addition to the advantageous effects of the first embodiment, when a passcode is not input, or a wrong passcode is input, setting history information is not displayed. Therefore, security on destination information can be made more stringent.

The present invention is not limited to the above-described embodiments, and various changes are available. Specifically, embodiments to be acquired by appropriately combining modified technical means within a range that does not depart from the gist of the present invention are also included in the technical scope of the present invention.

In addition, although some of the above-described embodiments are described separately for convenience of explanation, it is needless to say that it is possible to combine and implement the embodiments within a technically possible range.

In addition, a program operating in each device in the embodiments is a program (a program causing a computer to function) that controls a CPU or the like in such a way as to achieve functions of the above-described embodiments. Information to be handled by these devices is temporarily stored in a temporary storage device (e.g., a RAM) at the time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a nonvolatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disk (BD), and the like), a magnetic recording medium (e.g., a magnetic tape, a flexible disk, and the like), and the like. In addition, not only functions of the above-described embodiments are achieved by executing a loaded program, but also functions of the present invention may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present invention.

What is claimed is:

1. An information processing apparatus comprising:
   a storage;
   a controller; and
   a display, wherein
   the storage stores setting history information in which identification information of a terminal device is associated with history information pertaining to execution of a job using a destination to be managed by the terminal device,
   the controller restricts displaying the setting history information on the display when the information processing apparatus is not in a connected state to the terminal device, and displays the setting history information on the display when the information processing apparatus is in a connected state to the terminal device and when the identification information acquired from the terminal device in a connected state matches the identification information associated with the history information, and
   when the information processing apparatus is in a connected state to the terminal device, the controller further acquires destination information and the identification information from the terminal device, and when the executed job is a transmission job, the controller further determines whether the destination information acquired from the terminal device is used for the destination of the executed transmission job.

2. The information processing apparatus according to claim 1, wherein
   the storage further stores the setting history information in which information related to an execution user of the job is associated with the history information, and
   the controller further displays the setting history information on the display when a login user for the information processing apparatus matches the execution user.

3. The information processing apparatus according to claim 1, wherein
   the controller further displays, on the display, the setting history information in which the identification information is not associated with the history information.

4. The information processing apparatus according to claim 1, wherein
   when the information processing apparatus is in a connected state to the terminal device, the controller further displays, on the display, only the setting history information in which the identification information acquired from the terminal device in a connected state matches the identification information associated with the history information.

5. The information processing apparatus according to claim 1, wherein
   when the information processing apparatus is in a connected state to the terminal device, the controller further displays in a confidential manner, on the display, information related to the destination of the setting history information in which the identification information acquired from the terminal device does not match the identification information associated with the history information.

6. The information processing apparatus according to claim 1, wherein
   the controller further generates and transmits a passcode to the terminal device, and restricts displaying, on the display, the setting history information until the passcode is input, regardless of whether the identification information acquired from the terminal device matches the identification information associated with the history information.

7. An information processing method by an information processing apparatus capable of executing a job using a destination to be managed by a terminal device, comprising:
   storing setting history information in which identification information of the terminal device is associated with history information pertaining to execution of the job;
   when the information processing apparatus is not in a connected state to the terminal device, restricting displaying the setting history information on a display device;
   when the information processing apparatus is in a connected state to the terminal device, and when the identification information acquired from the terminal device in a connected state matches the identification information associated with the history information, displaying the setting history information on the display device;
   when the information processing apparatus is in a connected state to the terminal device, acquiring destination information and the identification information; and
   when the executed job is a transmission job, determining whether the destination information acquired from the terminal device is used for the destination of the executed transmission job.

8. The information processing apparatus according to claim 1, wherein
   when the controller determines the destination information acquired from the terminal device is used for the destination of the executed transmission job, the controller further generates the setting history information by associating the identification information acquired from the terminal device with the generated history information.

9. The information processing apparatus according to claim 1, wherein
   when the controller determines the destination information acquired from the terminal device is not used for the destination of the executed transmission job, the controller further generates the setting history information by not associating the identification information acquired from the terminal device with the generated history information.

* * * * *